(12) United States Patent
Eguchi et al.

(10) Patent No.: US 6,336,689 B1
(45) Date of Patent: Jan. 8, 2002

(54) BRAKE FLUID PRESSURE RETAINING UNIT

(75) Inventors: Takahiro Eguchi; Hirotoshi Inoue; Toshiya Kanda; Masakazu Shiraishi; Shouji Suzuki; Yoichi Sugimoto, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/517,524

(22) Filed: Mar. 2, 2000

(30) Foreign Application Priority Data

Mar. 3, 1999 (JP) ............................................ 11-054895

(51) Int. Cl.[7] ................................................ B60T 8/62
(52) U.S. Cl. .............................. 303/187; 303/DIG. 900; 303/DIG. 901; 303/191; 303/89; 188/DIG. 2
(58) Field of Search ....................... 303/187, DIG. 900, 303/DIG. 901, 191, 89; 188/DIG. 2

(56) References Cited

U.S. PATENT DOCUMENTS

| | | | | |
|---|---|---|---|---|
| 4,637,664 A | * | 1/1987 | Arikawa | 303/187 |
| 4,715,665 A | * | 12/1987 | Ostwald | 303/187 |
| 5,108,159 A | * | 4/1992 | Tsang et al. | 303/191 |
| 6,056,373 A | * | 5/2000 | Zechmann et al. | 303/191 |

FOREIGN PATENT DOCUMENTS

| | | | |
|---|---|---|---|
| JP | 60012360 | 1/1985 | B60T/7/12 |
| JP | 63043854 | 2/1988 | B60T/8/24 |
| JP | 09202159 | 8/1997 | B60K/41/24 |

* cited by examiner

*Primary Examiner*—Stephen T. Gordon
*Assistant Examiner*—Lori L. Coletta
(74) *Attorney, Agent, or Firm*—Sughrue Mion, PLLC

(57) ABSTRACT

A brake fluid pressure retaining unit for a vehicle comprises a solenoid valve SV arranged in a brake fluid passage FP between a master cylinder MC and a wheel cylinder WC so as to shut off or communicate the brake fluid passage FP. In the case that a transmission of the vehicle is shifted to a driving position, the solenoid valve SV is switched to a shut-off position when the vehicle stops with a brake pedal BP depressed. The solenoid valve SV is switched to a communicating position when driving force is exerted on the vehicle. Brake fluid pressure is retained within the wheel cylinder WC when the solenoid valve SV is in the shut-off position. The brake fluid pressure within the wheel cylinder is retained after releasing the brake pedal so that braking force continues to act on the vehicle. The brake fluid pressure retaining unit comprises control means CU such that when the solenoid valve is in the shut-off position and the transmission is shifted to a non-driving position, the solenoid valve SV is returned to the communicating position on condition that depression of the brake pedal BP is released.

2 Claims, 17 Drawing Sheets

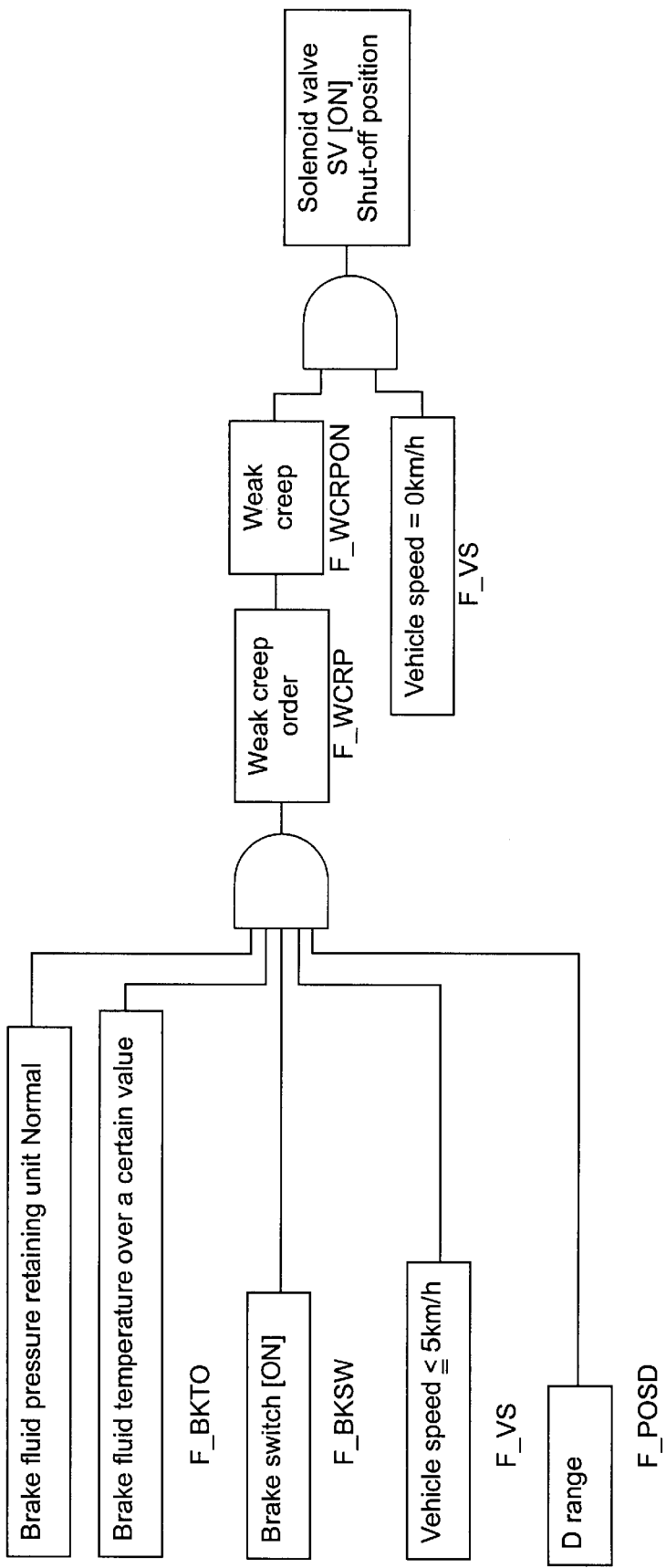

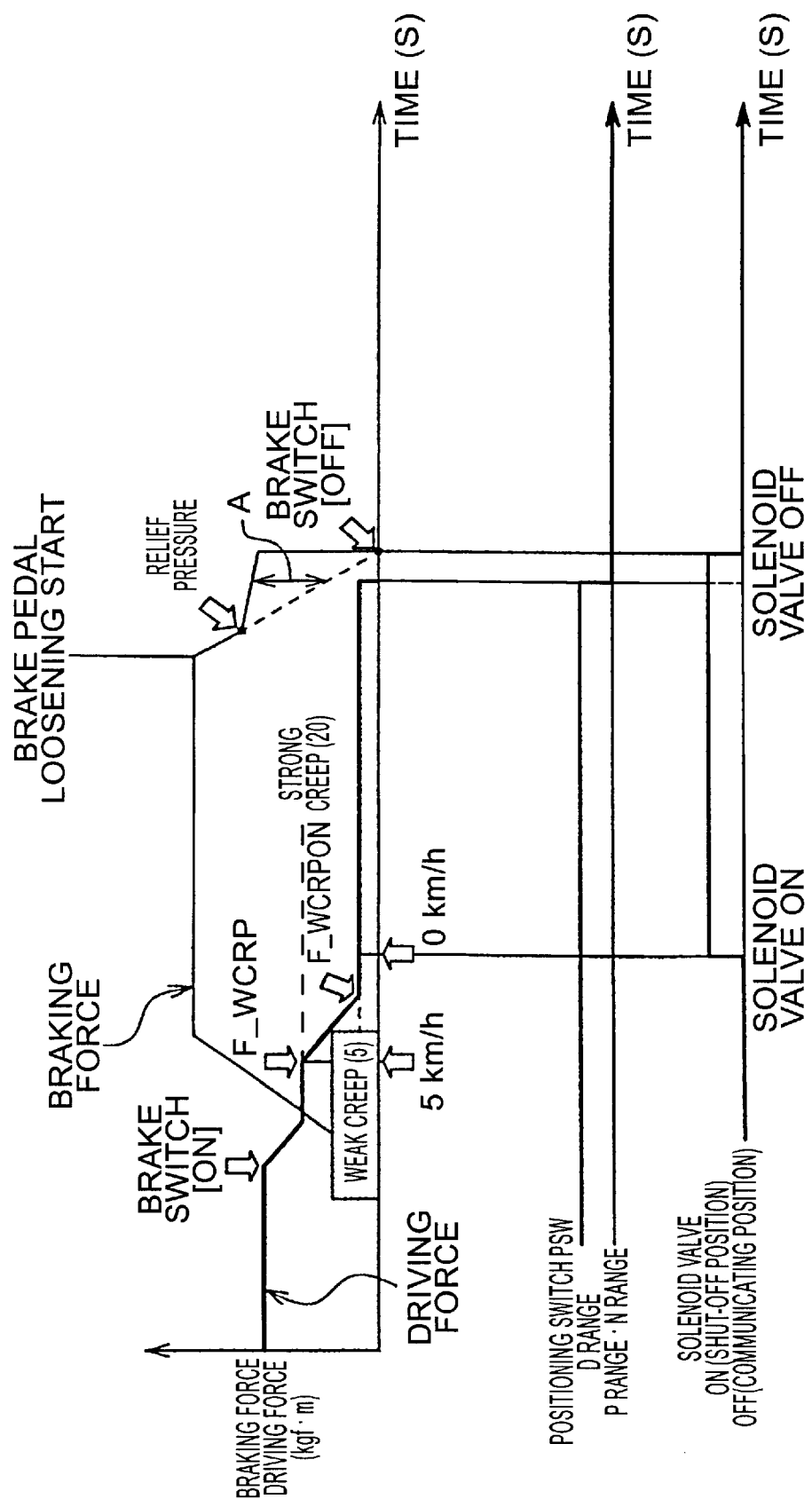

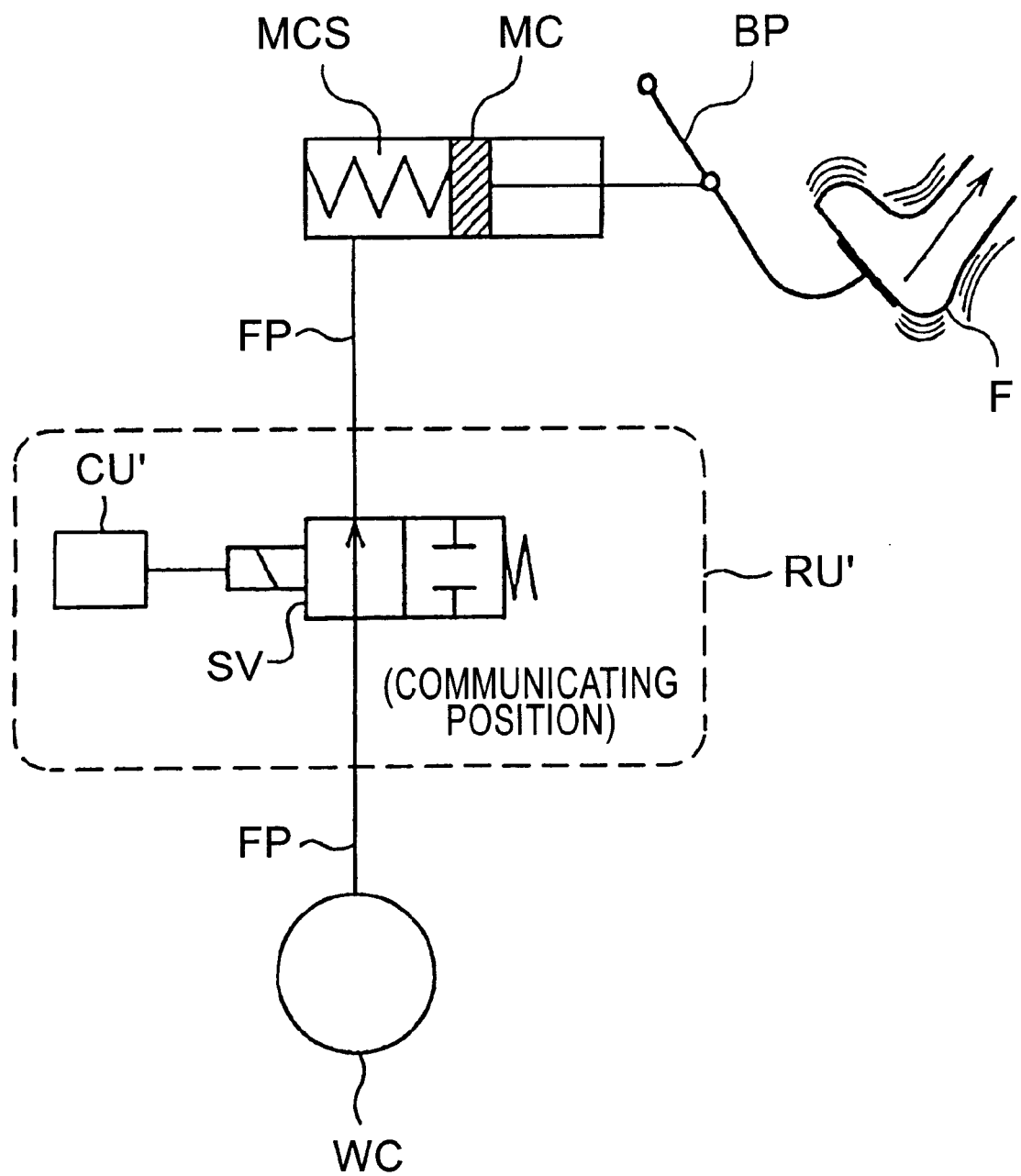

BRAKE FLUID PRESSURE RETAINING UNIT

FIELD OF THE INVENTION

The present invention relates to a brake fluid pressure retaining unit for retaining brake fluid pressure within a wheel cylinder after releasing a brake pedal. The brake fluid pressure retaining unit includes a solenoid valve arranged in a brake fluid passage between a master cylinder and a wheel cylinder so as to shut off the brake fluid passage.

BACKGROUND OF THE INVENTION

A brake fluid pressure retaining unit is known for facilitating a smooth starting operation on a slope without any unintentional backward displacement of a vehicle (for example Japanese Laid-open Patent Publication Nos. 63-43854 and 9-202159). In such a brake fluid pressure retaining unit, braking force continues to act on the vehicle after releasing the brake pedal until driving force is exerted on the vehicle.

In this known brake fluid pressure retaining unit, braking force is exerted on the vehicle without requiring driver's operation. However, it is preferable that the brake fluid pressure retaining unit merely works when necessary such that the driver does not experience awkward driving operation of the vehicle. Specifically, the brake fluid pressure retaining unit may be actuated when the transmission of the vehicle selects a driving position. When a non-driving position is selected and the vehicle does not start on a slope, the brake fluid pressure retaining unit does not have to be actuated. Accordingly, the brake fluid pressure retaining unit may be controlled so as to release retained brake fluid pressure when the transmission selects a non-driving position.

However, a problem occurs in a conventional brake fluid pressure retaining unit RU' shown in FIGS. 14A and 14B if the brake fluid pressure to be retained is released immediately after the transmission selects a non-driving position. The brake fluid pressure retaining unit RU' includes a solenoid valve SV arranged in a brake fluid passage FP between a master cylinder MC and a wheel cylinder WC so as to shut off the brake fluid passage FP for retaining brake fluid pressure within the wheel cylinder WC as instructed by a control unit CU'. Such a brake fluid pressure retaining unit is known for example from Japanese Laid-open Patent Publication Nos. 60-12360 and 63-43854.

As shown in FIG. 14A, when the brake fluid pressure retaining unit RU' is actuated, the solenoid valve SV shuts off the brake fluid passage FP for retaining brake fluid pressure within the wheel cylinder WC. When the driver shifts the transmission from a driving position to a non-driving position, the solenoid valve SV is switched to a communicating position where the solenoid valve SV allows communication of the brake fluid passage FP, thereby communicating the master cylinder MC and the wheel cylinder WC as shown in FIG. 14B. No problem occurs if the transmission is shifted to a non-driving position (1) when the driver does not depress the brake pedal BP or (2) while the driver depresses the brake pedal BP, i.e. pressure difference between the master cylinder MC and the wheel cylinder WC is small.

However, if the transmission is shifted to a non-driving position while the driver is loosening the brake pedal BP, impact is transmitted to the driver's foot F due to fluctuation of brake fluid pressure upon communication of the brake fluid passage FP (FIG. 14B).

When the driver loosens the brake pedal BP while the solenoid valve SV is at a shut-off position where the solenoid valve SV shuts off the brake fluid passage FP, brake fluid pressure within the master cylinder MC decreases by way of resilient action of a return spring MCS. Meanwhile, brake fluid pressure within the wheel cylinder WC is retained since the solenoid valve SV is at the shut-off position. Therefore, pressure difference is made between the wheel cylinder WC and the master cylinder MC. If the driver shifts the transmission from a driving position to a non-driving position before leaving his foot from the brake pedal BP, the solenoid valve SV is switched to the communicating position and greater brake fluid pressure at the wheel cylinder WC is instantly transferred to the master cylinder MC. This creates pressure fluctuation, which gives impact to the driver's foot F placed on the brake pedal BP.

Accordingly, the object of the invention is to eliminate the above drawback.

SUMMARY OF THE INVENTION

With the aforementioned drawback in view, the present invention seeks to provide a brake fluid pressure retaining unit for a vehicle, which comprises a solenoid valve arranged in a brake fluid passage between a master cylinder and a wheel cylinder and switchable between a communicating position where the brake fluid passage is communicating and a shut-off position where the brake fluid passage is shut off for retaining brake fluid pressure within the wheel cylinder, the solenoid valve being switched from the communicating position to the shut-off position when the vehicle stops with a brake pedal depressed on condition that a transmission of the vehicle is selected to a driving position, and the solenoid valve being returned to the communicating position when driving force is exerted on the vehicle, and brake fluid pressure retained within the wheel cylinder being kept until driving force is exerted on the vehicle such that braking force continues to act on the vehicle after releasing the brake pedal, wherein the brake fluid pressure retaining unit further comprises means for controlling said solenoid valve such that when the solenoid valve is in the shut-off position and the transmission is shifted from a driving position to a non-driving position, the solenoid valve is returned to the communicating position on condition that depression of the brake pedal is released.

According to the present invention, when the transmission is shifted from a driving position to a non-driving position with the solenoid valve switched to the shut-off position, the solenoid valve is returned to the communicating position on condition that depression of the brake pedal is released.

With such construction, even if the transmission is shifted from a driving position to a non-driving position, the solenoid valve is still in the shut-off position unless the driver releases the brake pedal. The solenoid valve is returned to the communicating position after depression of the brake pedal is released.

If depression of the brake pedal is released, the driver's foot is not placed on the brake pedal, or otherwise the brake pedal is not returned further notwithstanding the driver places his foot on the brake pedal.

The term "driving position" in the transmission refers to a running range such as "D range" in the case of automatic transmission and a starting gear such as "Low speed gear" in the case of manual transmission. Also, the term "non-driving position" in the transmission refers to a non-driving range such as "N range" or "P range" in the case of automatic transmission and "Neutral" in the case of manual transmission.

The wording "when driving force is exerted on the vehicle" means that output of a motor such as an engine and an electric motor is transmitted to wheels of the vehicle, and the vehicle is ready to start on an up slope with such driving force thus generated. Specifically, it means that (1) in the case of a manual transmission type vehicle, the time when the driver engages the clutch, (2) in the case of an automatic transmission type vehicle, the time when the driver depresses the accelerator pedal or (3) in the case of an automatic transmission type vehicle, in which driving force is automatically increased in accordance with releasing of the brake pedal so as to resist a slope, the time when the increment of the driving force is achieved (for example when the vehicle reaches to a "strong creep condition" such as described in Preferred embodiments of the present invention).

Another object of the invention is to provide a brake fluid pressure retaining unit for a vehicle, which comprises a solenoid valve arranged in a brake fluid passage between a master cylinder and a wheel cylinder and switchable between a communicating position where the brake fluid passage is communicating and a shut-off position where the brake fluid passage is shut off for retaining brake fluid pressure within the wheel cylinder, the solenoid valve being switched from the communicating position to the shut-off position when the vehicle stops with a brake pedal depressed on condition that a transmission of the vehicle is selected to a driving position, and the solenoid valve being returned to the communicating position when driving force is exerted on the vehicle, and brake fluid pressure retained within the wheel cylinder being kept until driving force is exerted on the vehicle such that braking force continues to act on the vehicle after releasing the brake pedal, wherein said brake fluid pressure retaining unit is controlled such that when the solenoid valve is in the shut-off position and the transmission is shifted from a driving position to a non-driving position, the solenoid valve is returned to the communicating position on condition that depression of the brake pedal is released.

BRIEF DESCRIPTION OF THE DRAWINGS

FIGS. 2A and 2B show the control of the brake fluid pressure retaining unit while a vehicle stops, in which FIG. 2A shows the logic for switching a solenoid valve to a shut-off position, and FIG. 2B shows the logic for switching a solenoid valve to a communicating position.

FIGS. 4A and 4B show the control of the brake fluid pressure retaining unit while a vehicle stops, in which FIG. 4A shows the logic for switching a solenoid valve to a shut-off position, and FIG. 4B shows the logic for automatically turning off the engine.

FIGS. 5A and 5B show the control of the brake fluid pressure retaining unit such as when the transmission of the vehicle is shifted, in which FIG. 5A shows the logic for switching a solenoid valve to a communicating position, and FIG. 5B shows the logic for automatically starting the engine.

FIG. 13 is a time chart corresponding to FIG. 11, in which the engine is not automatically turned off when the vehicle stops.

FIGS. 14A and 14B show a conventional brake fluid pressure retaining unit.

DESCRIPTION OF THE PREFERRED EMBODIMENTS

A brake fluid pressure retaining unit according to the present invention may be applicable for all kinds of vehicles which have a braking device operable by hydraulic pressure (brake fluid pressure) and are provided with a motor. Here, the term "motor" includes an engine such as an internal combustion engine driven by gasoline and the like, and an electric motor. Also, the term "vehicle" includes a manual transmission type vehicle and an automatic transmission type vehicle. Such brake fluid pressure retaining units may be applicable to both types.

A brake fluid pressure retaining unit according to the present invention will be described in greater detail.

<Construction of Brake Fluid Pressure Retaining unit>

A brake fluid pressure retaining unit according to the invention is incorporated in a brake fluid passage of a hydraulically operable braking device. The brake fluid pressure retaining unit comprises a solenoid valve to be switched between a communicating position where the brake fluid passage is communicating and a shut-off position where the brake fluid passage is shut off for retaining brake fluid pressure. The brake fluid pressure retaining unit further comprises control means (control unit) for controlling the solenoid valve by detecting depression of a brake pedal and the like.

Figure 1:
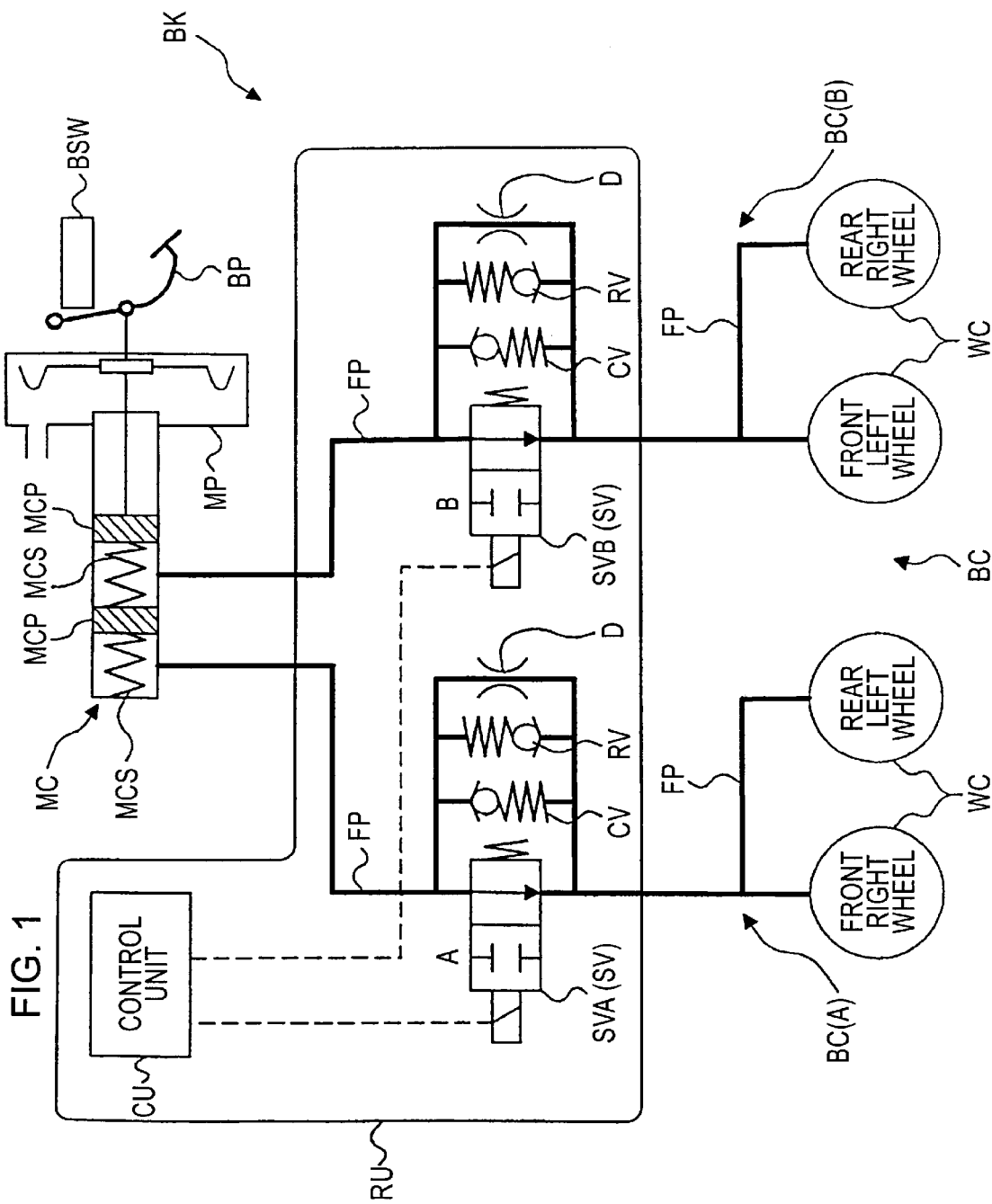
FIG. 1 shows a brake fluid pressure retaining unit according to the present invention.

With reference to FIGS. 1 and 2, the brake fluid pressure retaining unit will be described in relation to a hydraulically operable braking device.

<Hydraulically Operable Braking Device>

A hydraulically operable braking device is shown in FIG. 1. A brake fluid pressure circuit BC of a hydraulically operable braking device BK comprises a master cylinder MC, wheel cylinder WC and a brake fluid passage FP connecting the master cylinder MC and the wheel cylinder WC. Since braking is a very important factor for safety, the braking device BK has two separate systems of brake fluid pressure circuits BC(A), BC(B).

A master cylinder piston MCP is inserted into a main body of the master cylinder MC. When the driver depresses the brake pedal BP and applies a load thereto, the piston MCP is pressed and pressure is applied to brake fluid within the master cylinder MC so that the mechanical force is converted into brake fluid pressure. When the driver releases the brake pedal for removing the applied load, the piston MCP is returned to the original position by the resilient action of a return spring MCS and the brake fluid pressure is released. In view of a fail-safe mechanism, there are provided two separate brake fluid pressure circuits BC. For this reason, the master cylinder MC shown in FIG. 1 is a tandem master cylinder, where two pistons MCP, MCP are connected in series so that a main body of the master cylinder MC is divided into two portions. The master cylinder MC is connected to a non-shown reservoir tank for brake fluid, and the amount of brake fluid within the brake fluid pressure circuit BC is adjusted.

A master power MP (brake booster) is provided between the brake pedal BP and the master cylinder MC so as to ease the braking effort of the driver. The master power MP shown in FIG. 1 is a vacuum servo type. The master power MP takes out negative pressure from an intake manifold of a non-shown engine 1 (referring to FIG. 3) so as to facilitate the braking operation of the driver.

The brake fluid passage FP connects the master cylinder MC and the wheel cylinder WC. The brake fluid passage FP functions as a fluid channel for brake fluid. Brake fluid pressure generated at the master cylinder MC is transmitted to the wheel cylinder WC since a flow of the brake fluid travels through the brake fluid passage FP. When the brake fluid pressure within the wheel cylinder WC is greater, the brake fluid is transmitted from the wheel cylinder WC to the master cylinder MC through the brake fluid passage FP. Since separate brake fluid pressure circuits BC are provided for the reason mentioned above, there are also provided two separate brake fluid passages FP, FP.

The wheel cylinder WC is provided for each wheel so that the brake fluid pressure generated at the master cylinder MC and transmitted to the wheel cylinder WC through the brake fluid passage FP is converted into a mechanical force for braking wheels (braking force). A piston is inserted into the wheel cylinder WC so that when the piston is pressed by the brake fluid pressure, it generates a braking force for actuating brake pads in the case of disc brakes or brake shoes in the case of drum brakes.

<Brake Fluid Pressure Retaining unit>

With reference to FIG. 1, the brake fluid pressure retaining unit RU according to the present invention will be described. The brake fluid pressure retaining unit RU comprises a solenoid valve SV within the brake fluid passage FP so as to shut off a flow of brake fluid. The brake fluid pressure retaining unit RU is further provided with control means (control unit) CU so as to control the solenoid valve SV. If necessary, the brake fluid passage FP may be provided with a restriction D, check valve CV or a relief valve RV.

The solenoid valve SV is actuated by an electric signal from the control unit CU. The solenoid valve SV shuts off a flow of brake fluid within the brake fluid passage FP in its shut-off position so as to retain brake fluid pressure applied to the wheel cylinder WC. A flow of brake fluid within the brake fluid passage FP is communicated when the solenoid valve SV is in a communicating position. Provision of the solenoid valve SV prevents unintentional backward displacement of the vehicle. This is because when the driver releases the brake pedal BP upon starting the vehicle on a slope, brake fluid pressure is retained within the wheel cylinder WC. The term "unintentional backward displacement" means that the vehicle moves in an opposite direction due to its potential energy (own weight), in other words, the vehicle begins to descend backwardly on a slope.

The term "solenoid valve SV" also includes a servo valve, which functions for adjusting degrees of valve opening.

The restriction D is provided in case of necessity. The restriction D always connects the master cylinder MC and the wheel cylinder WC notwithstanding that the solenoid valve SV is actuated or not. Especially when the solenoid valve SV is in the shut-off position and the driver gradually or at a time releases the brake pedal BP, the restriction D reduces the brake fluid pressure within the wheel cylinder WC at a certain speed by gradually transferring the brake fluid from the wheel cylinder WC to the master cylinder MC. Such a restriction D may be formed by the provision of a flow control valve in the brake fluid passage FP.

With the provision of the restriction D when the driver gradually or at a time releases the brake pedal BP, braking force is gradually lowered so that even if the solenoid valve SV is in the shut-off position, brake does not work permanently. Therefore, even if the solenoid valve SV is in the shut-off position, braking force is reduced after a certain period of time so that the vehicle can be restarted on an up slope by the driving force of the vehicle. Meanwhile, the vehicle can be started on a down slope due to its potential energy without requiring the accelerator pedal operation of the driver.

Reduction speed of brake fluid pressure within the wheel cylinder WC is determined so as to keep sufficient time for pedal-changing action of the driver from the brake pedal BP to the accelerator pedal that is the time for generating sufficient driving force on the vehicle so as to start the vehicle on the slope without unintentional backward displacement thereof. Normally, the time required for the pedal-changing action and for obtaining sufficient driving force on the vehicle is about 0.5 seconds.

A check valve Cv is provided in case of necessity The check valve CV transfers brake fluid pressure generated within the master cylinder MC into the wheel cylinder WC when the solenoid valve SV is in the shut-off position and the driver increases a brake pedal load. The check valve CV works effectively when the brake fluid pressure generated within the master cylinder MC is greater than the brake fluid pressure within the wheel cylinder WC, thereby quickly increasing the brake fluid pressure within the wheel cylinder WC in accordance with the increased brake pedal load.

A relief valve RV is also provided in case of necessity. The relief valve RV transfers brake fluid within the wheel cylinder WC into the master cylinder MC when the solenoid valve SV is closed and the driver gradually or at a time releases the brake pedal BP. The transfer of the brake fluid is carried out until the brake fluid pressure within the wheel cylinder WC decreases to a certain pressure level.

Figure 2A:
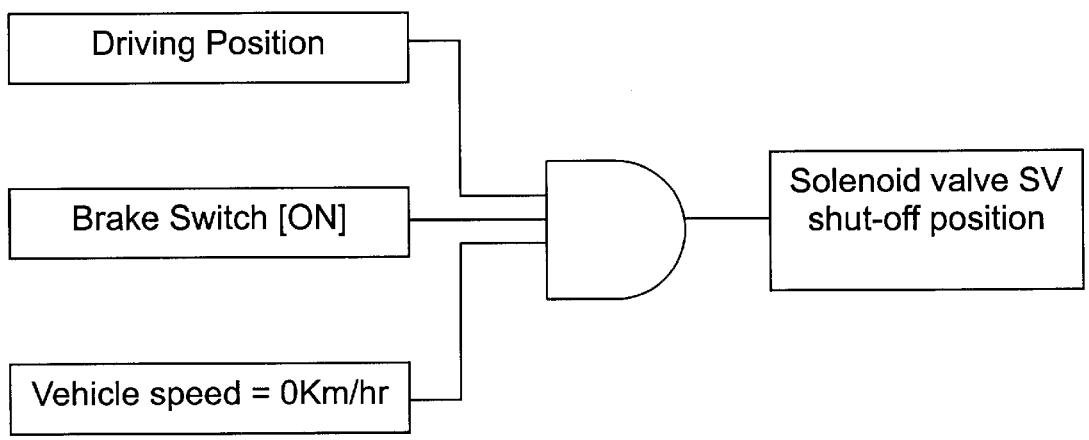
Figure 2B:
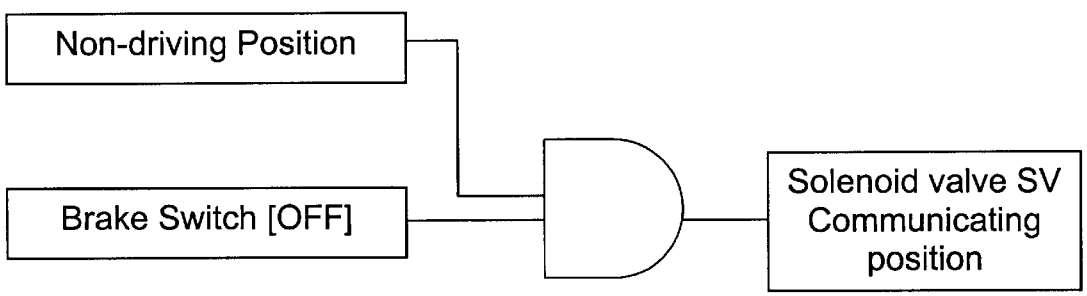

The control unit CU detects vehicle speed, depression of the brake pedal BP, driving position of the transmission and the like, as to switch the solenoid valve SV from the communicating position to the shut-off position and vise versa FIGS. 2A and 2B show the logic for switching the solenoid valve SV. According to the logic, the solenoid valve SV is switched to the shut-off position when the vehicle stops (vehicle speed=0 km/hr) with the brake pedal BP depressed (brake switch BSW [ON]) on condition that a transmission of the vehicle is selected to a driving position (FIG. 2A). Meanwhile, the solenoid valve SV is switched to the communicating position such as when driving force is exerted on the vehicle, when the transmission selects a non-driving position or the like. However, in the brake fluid pressure retaining unit RU according to the present invention, (1) even if the transmission is shifted to a non-driving position, (2) the solenoid valve SV is not switched to the communicating position unless depression of the brake pedal is released (brake switch BSW [OFF]) (referring to FIG. 2B).

Impact may be transmitted to the driver's foot if the solenoid valve SV is switched to the communicating position irrespective of depression of the brake pedal BP. The brake fluid pressure within the wheel cylinder WC becomes greater than that within the master cylinder MC during the release of the brake pedal BP. This is because the solenoid valve SV is in the shut-off position. If the solenoid valve SV is switched to the communicating position under such circumstances, greater brake fluid pressure within the wheel cylinder WC is instantly transmitted to the master cylinder MC, thereby resulting in pressure fluctuation. The driver then receives impact to his foot through the brake pedal BP.

However, when depression of the brake pedal is released and the brake switch BSW is OFF, impact is not transmitted to the driver's foot even if the transmission selects a driving position and the solenoid valve SV is switched to the communicating position such that greater brake fluid pressure within the wheel cylinder WC is instantly transferred to the master cylinder MC. When the brake switch BSW is OFF, the brake pedal BP is completely returned to its original position, allowing no further returning action of the brake pedal BP, but otherwise the driver has already left his foot from the brake pedal BP.

Accordingly, the present invention includes a further condition as logic in that depression of the brake pedal is released.

The brake switch BSW detects whether the brake pedal BP is depressed or not. The control unit CU then controls the solenoid valve SV based on the detected value of the brake switch BSW. The brake switch BSW becomes ON if the brake pedal BP is depressed, and it becomes OFF if depression of the brake pedal BP is released.

<Basic Operation of the Brake Fluid Pressure Retaining Unit>

With reference to FIGS. 1 and 2A–2B, basic operation of the brake fluid pressure retaining unit according to the invention will be described.

(Switching Operation of Solenoid Valve to Shut-off Position While Vehicle Stops)

The brake fluid pressure retaining unit RU (control unit CU) of the present invention switches the solenoid valve SV to its shut-off position where the brake fluid passage FP is shut off (FIG. 2A) when the vehicle stops with the brake pedal BP depressed on condition that the transmission is selected to a driving position. Since the vehicle stops, no problem would occur if the brake fluid passage FP is shut off for retaining brake fluid pressure within the wheel cylinder WC. Further, since the transmission is shifted to a driving position, it can be considered that the driver intends to restart the vehicle. Therefore, brake fluid pressure is retained within the wheel cylinder WC so as to facilitate the starting operation on a slope.

(Switching Operation of Solenoid Valve to Communicating Position)

As mentioned above, the brake fluid pressure retaining unit RU (control unit CU) of the present invention switches the solenoid valve SV to its communicating position (FIG. 2B) on condition that the transmission is selected to a non-driving position and depression of the brake pedal is released. Since the solenoid valve SV is switched to the communicating position under such conditions, impact is not transmitted to the driver's foot for the reason mentioned above.

The transmission is shifted to a non-driving position in certain circumstances such as when the vehicle stops for a while, when the driver leaves the vehicle, and when the driver pulls up at a traffic light. According to the brake fluid pressure retaining unit RU of the invention, the transmission can be shifted to a non-driving position without any problems while loosening the brake pedal BP. This is because the solenoid valve SV is switched to the communicating position after depression of the brake pedal is released.

(Stop/Start Operations on Up Slope)

For example, when the vehicle has to stop at a traffic light on an up slope, the driver depresses the brake pedal BP so as to prevent the vehicle from unintentional backward displacement due to its own weight. Brake fluid pressure generated within the master cylinder MC results in a flow of brake fluid, which flows from the master cylinder MC to the wheel cylinder WC through the brake fluid passage FP and the solenoid valve SV in the communicating position, and hence the vehicle pulls up on the slope.

The control unit CU judges conditions including the stop of the vehicle and switches the solenoid valve SV to the shut-off position so as to retain brake fluid pressure within the wheel cylinder WC. The control unit CU is not required to judge whether the vehicle stops on a slope or not. However, the control unit CU may of course judge such conditions. In the case of the arrangement where a check valve Cv is provided, even if the solenoid valve SV is in the shut-off position, braking force is increased through the check valve CV when the driver further increases the brake pedal load.

In order to initiate a starting operation of the vehicle on a slope, the driver releases the brake pedal BP and in stead depresses the non-shown accelerator pedal. During the operation, since the solenoid valve SV is in the shut-off position and the brake fluid pressure is retained within the wheel cylinder WC, the vehicle is prevented from unintentional backward displacement even if the driver releases the brake pedal BP. Meanwhile, when the driver depresses the accelerator pedal, driving force is exerted on the vehicle. However, if the solenoid valve SV remains in the shut-off position, the vehicle can not start to move on the slope. Therefore, the control unit CU returns (switches) the solenoid valve SV to the communicating position when sufficient driving force is exerted to start the vehicle on the slope by way of depressing the accelerator pedal. Braking force is then lost and the vehicle can start-on the slope.

In the case of the arrangement where a restriction D is provided, brake fluid pressure within the wheel cylinder WC gradually decreases through the restriction D notwithstanding that the solenoid valve SV is in the shut-off position. At the same time, braking force also gradually decreases. Meanwhile, driving force increases since the driver depresses the accelerator pedal. The vehicle can start to move on the slope when the driving force of the vehicle becomes greater than the total amount of the gravitational prevention force, which prevents the vehicle from the advancing on the slope, and the braking force, which has been gradually reducing.

The provision of the restriction D ensures a smooth starting operation of the vehicle on the slope unless the vehicle displaces backward for 0.5 seconds after the driver releases the brake pedal BP. Normally, sufficient driving force is obtained for the vehicle such as by depressing the accelerator pedal at 0.5 seconds after releasing the brake pedal BP. Provision of the relief valve RV ensures a smooth starting operation of the vehicle even if the driver has forcefully depressed the brake pedal BP more than required. This is because the brake fluid pressure within the wheel cylinder WC immediately decreases to a certain brake fluid pressure level (relief pressure) after the driver gradually or at a time releases the brake pedal BP.

Preferably, the solenoid valve SV is switched to the communicating position when driving force is generated since the vehicle can not start or brake dragging will be caused if the solenoid valve SV is continuously kept in the shut-off position.

(Stop/Start Operations on Down Slope)

When stopping the vehicle on a down slope, the driver depresses the brake pedal BP. The control unit CU judges conditions including the stop of the vehicle and switches the solenoid valve SV to the shut-off position so as to retain brake fluid pressure within the wheel cylinder WC. As mentioned above, the control unit CU does not judge whether the vehicle is stopped on a slope.

In order to start off the vehicle on the down slope, the driver then releases the brake pedal BP. Normally, in a down slope, the driver does not depress the accelerator pedal when starting the vehicle. The driver merely releases the brake pedal BP so that the vehicle can start to move due to its own weight. In this case, the vehicle can start on the down slope if control is carried out such that the solenoid valve is switched to the communicating position at a certain period of time after releasing the brake pedal BP.

In the brake fluid pressure retaining unit RU provided with a restriction D, notwithstanding that the solenoid valve SV is in the shut-off position, braking force gradually decreases after the driver gradually or at a time releases the brake pedal BP. As a result, similar to the starting operation of the normal vehicle on a down slope, the vehicle can start on the slope without depressing the accelerator pedal even if the solenoid valve SV is in the shut-off position.

According to the brake fluid pressure retaining unit RU, if the transmission has been shifted to a non-driving position, unnecessary operation for holding the solenoid valve to the shut-off position so as to actuate the brake fluid pressure retaining unit RU is canceled.

EXAMPLES

The present invention will be described in greater detail by way of specific examples.

Figure 3:
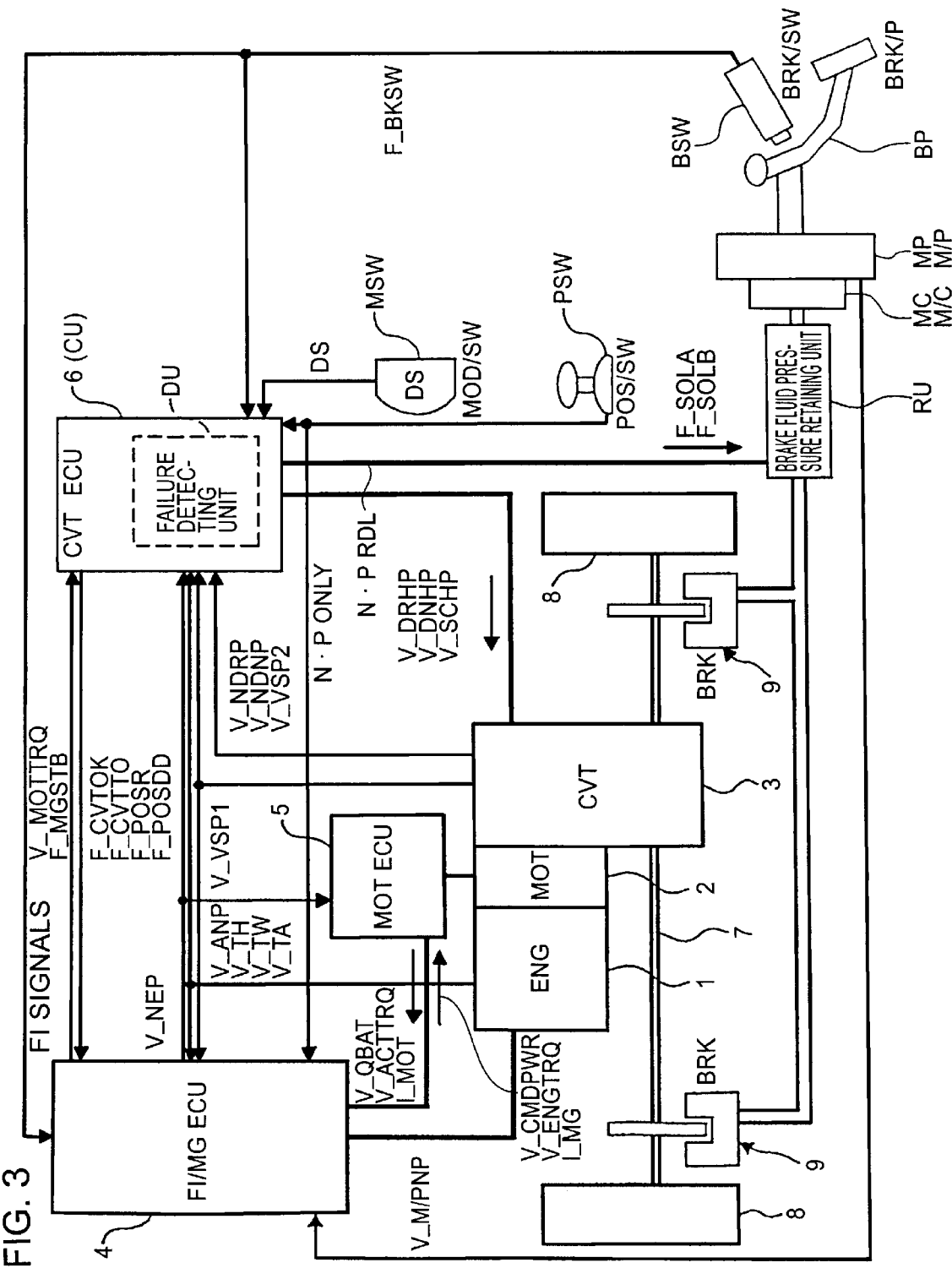
FIG. 3 shows a system configuration of a vehicle including the brake fluid pressure retaining unit according to the present invention.

In this example, a brake fluid pressure retaining unit according to the present invention is applied to an automatic transmission vehicle (hereinafter referred to as a vehicle). The system configuration of this vehicle is shown in FIG. 3.

The vehicle shown in this example is a hybrid vehicle having an engine and an electric motor as a driving motor, and is provided with a belt-type continuously variable transmission (hereinafter referred to as CVT) as a transmission. The brake fluid pressure retaining unit RU applied to the vehicle includes a solenoid valve SV, restriction D, relief valve RV and a check valve CV in the brake fluid pressure circuit BC. This brake fluid pressure retaining unit RU is the same as that shown in FIG. 1.

The vehicle is further provided with a driving force reduction apparatus or/and a driving motor stopping apparatus. The driving force reduction apparatus is for reducing creep driving force on condition that the driving motor is idling, the vehicle moves under a certain speed, and the brake pedal BP is depressed. The driving motor stopping apparatus is for automatically stopping the driving motor while the vehicle stops. Moreover, the vehicle is provided with a system for automatically initiating automatic control for generating driving force on condition that the brake pedal BP is released and the brake switch BSW is off.

The vehicle is further provided with a control unit CU such that when the vehicle stops and the transmission is shifted from a driving position to a non-driving position, the solenoid valve SV is returned to the communicating position on condition that depression of the brake pedal is released.

<System Configuration>

The system configuration of the vehicle will be described with reference to FIG. 3. The vehicle is provided with an engine 1 and a motor 2 as a driving motor, and a belt-type continuously variable transmission (CVT 3) as a transmission. The engine 1 is controlled at a fuel injection electronic control unit (hereinafter referred to as FI ECU). The FI ECU is integrally constructed with a management electronic control unit (hereinafter referred to as MG ECU), and it is equipped in a fuel injection/management electronic control unit 4 (hereinafter referred to as FI/MG ECU). The motor 2 is controlled at a motor electronic control unit 5 (hereinafter referred to as MOT ECU). Further, the CVT 3 is controlled at a CVT electronic control unit 6 (hereinafter referred to as CVT ECU) The CVT ECU 6 corresponds to the control unit CU described above.

A drive axle 7 provided with driving wheels 8, 8 is mounted to the CVT 3. Each driving wheel 8, 8 is provided with a disc brake 9, which includes a wheel cylinder WC and the like (FIG. 1). The wheel cylinders WC of the disc brakes 9,9 are connected to a master cylinder MC through the brake fluid pressure retaining unit RU. When the driver depresses the brake pedal BP, brake pedal load generated is transmitted to the master cylinder MC through a master power MP. The brake switch BSW detects whether the brake pedal BP is depressed or not. Depression of the brake pedal BP may be detected by way of detecting brake fluid pressure value within the master cylinder MC.

The engine 1 is an internal combustion engine, which makes use of thermal energy. The engine 1 drives the driving wheels 8, 8 through the CVT 3 and the drive axle 7. In order to improve fuel economy, the engine 1 may be automatically turned off when the vehicle stops. For this reason, the vehicle is provided with a driving motor stopping apparatus for automatically turning off the engine 1 when certain automatic engine stop conditions are satisfied.

The motor 2 has an assist mode for the assist of the engine drive with the use of electric energy from a non-shown battery. The motor 2 has a regeneration mode for converting the kinetic energy derived from the rotation of the drive axle 7 into electric energy. When the engine does not require the assist from the assist mode (such as for starting on a down slope or deceleration of the vehicle), the thus converted electric energy is stored in a non-shown battery. Further, the motor 2 has an actuation mode for actuating the engine 1.

The CVT 3 includes an endless belt winded between a drive pulley and a driven pulley so as to enable continuously variable gear ratio by changing a winding radius of the endless belt. Change of the winding radius is achieved by changing each pulley width. The CVT 3 engages the clutch and an output shaft so as to transmit the output of the engine 1 converted by the endless belt into the drive axle 7 through gears at the output side of the clutch. The vehicle equipped with the CVT 3 enables creep running, and such a vehicle requires a driving force reduction apparatus for reducing the driving force to be utilized for the creep running. Driving force of the creep running is adjustable by the engaging force of the clutch. The driving force of the creep running is adjusted for two conditions, i.e., strong driving force and weak driving force. The strong driving force is equivalent to a driving force to keep the vehicle stationary on the slope at an inclination angle of 5 degrees. This is called "strong creep" in this example. In the weak driving force, almost no driving force is obtained. This is called "weak creep" in this example. In the strong creep, when the accelerator pedal is released (i.e., the vehicle is in the idling condition) and a positioning switch is selecting a running range (D range, L range or R range), the vehicle moves slowly after releasing the brake pedal BP as if the vehicle creeps on the ground. In the weak creep, however, when the vehicle moves under a certain low speed and the brake pedal BP is depressed, the vehicle stops or moves at a very low speed.

Range positions of the positioning switch PSW is selected by a shift lever. Such range positions are selected from P range to be used for parking the vehicle, N range as a neutral range, R range for backward running, D range to be used for a normal run, and L range to be used for obtaining a sudden acceleration or strong engine brake. Three ranges including D range, L range and R range are corresponding to a driving position, and two ranges including P range and N range are corresponding to a non-driving position. Further, when the positioning switch PSW selects the D range, D mode as a normal running mode and S mode as a sports mode can be selected by a mode switch MSW.

The FI ECU contained in the FI/MG ECU 4 controls the amount of fuel injection so as to achieve the optimum air fuel ratio, and it also generally controls the engine 1. Various kinds of information such as a throttle angle and conditions of the engine 1 are transmitted to the FI ECU such that the engine 1 is controlled based on such information. The MG ECU contained in the FI/MG ECU 4 mainly controls the MOT ECU 5 as well as judges automatic engine stop conditions and automatic engine actuation conditions. The MG ECU receives information as to conditions of the motor 2 and other information such as conditions of the engine 1 from the FI ECU, and based on such information it sends instructions about the mode switching of the motor 2 to the MOT ECU 5. Further, the MG ECU receives information such as conditions of the CVT 3, conditions of the engine 1, range information of the positioning switch PSW, conditions of the motor 2 and the like, and based on such information it judges whether the engine 1 should be automatically stopped or automatically actuated.

The MOT ECU 5 controls the motor 2 based on a control signal from the FI/MG ECU 4. The control signal from the FI/MG ECU 4 includes mode information instructing actuation of the engine 1 by the motor 2, assistance of the engine actuation or regeneration of electric energy, and an output required value to the motor 2, and the MOT ECU 5 sends an order to the motor 2 based on such information. Further, the MOT ECU 5 receives information from the motor 2 and transmits information such as the amount of generated energy or the capacity of the battery to the FI/MG ECU 4.

The CVT ECU 6 as a control unit CU controls the transmission gear ratio of the CVT 3, the engagement force of the clutch and the like. Various kinds of information such as conditions of the CVT 3, conditions of the engine 1, range information of the positioning switch PSW and the like are transmitted to the CVT ECU 6, and based on such information the CVT ECU 6 transmits a signal to the CVT 3, the signal of which includes the control of hydraulic pressure of each cylinder provided at the drive pulley and the driven pulley of the CVT 3, and the control of hydraulic pressure of the clutch. The CVT ECU 6 further controls the ON/OFF operation of the solenoid valves SV in the brake fluid pressure retaining unit (FIG. 1) as well as carries out the judgment as to whether the creep driving force should correspond to the strong creep or the weak creep. The CVT ECU 6 is equipped with a failure-detecting unit DU for the purpose of detecting malfunction of the brake fluid pressure retaining unit RU. The failure-detecting unit DU is provided with a driving circuit for the ON/OFF operation of the solenoid valve SV in the brake fluid pressure retaining unit RU.

The disk brakes 9, 9 are constructed such that a disk rotor rotatable with the driving wheel 8 is pressed between the brake pads moved by the wheel cylinder WC (FIG. 1) and the braking force is obtained by the frictional force therebetween. The brake fluid pressure within the master cylinder MC is transmitted to the wheel cylinder WC through the brake fluid pressure retaining unit RU.

With the provision of the brake fluid pressure retaining unit RU brake fluid pressure within the wheel cylinder WC keeps on acting even after releasing the brake pedal BP. The brake fluid pressure retaining unit RU comprises a driving circuit for the failure-detecting unit DU within the CVT ECU 6 so as to actuate the solenoid valves SVA, SVB (ON/OFF) in the brake fluid pressure retaining unit RU.

The ON/OFF operation of the solenoid valve is meant as follows. In the normally open type solenoid valve, when the solenoid valve is turned on (ON), the valve is switched to the shut-off position, and when the solenoid valve is turned off (OFF), the valve is switched to the communicating position. In the normally closed type solenoid valve, when the solenoid valve is turned on (ON), the valve is switched to the communicating position, and when the solenoid valve is turned off (OFF), the solenoid valve is switched to the shut-off position. The solenoid valve SV in this example is of normally open type. The driving circuit supplies a coil of each solenoid valve SV with electric currents so as to turn on the solenoid valve SV, and stops the supply of electric currents so as to turn off the solenoid valve.

The master cylinder MC, master power MP, brake switch BSW and the like are the same as those previously described.

The driving force reduction apparatus equipped in the vehicle comprises the CVT 3 and the CVT ECU 6. When the brake pedal BP is depressed and the vehicle moves under 5 km/h (under a certain low speed), the driving force reduction apparatus reduces the creep driving force from the strong creep to the weak creep. The driving force reduction apparatus judges whether the brake pedal BP is depressed. This is carried out at the CVT ECU 6 based on a signal from the brake switch BSW. The driving force reduction apparatus also judges from vehicle speed pulse whether the vehicle moves under 5 km/h. When the driving force reduction apparatus judges the conditions that the brake pedal BP is depressed and the vehicle moves under 5 km/h, the CVT ECU 6 sends an order to the CVT 3 for reducing the engaging force of the clutch, thereby reducing the creep driving force. In addition to the above two basic conditions, the CVT ECU 6 further judges other conditions in that the brake fluid temperature is over a certain value, that the brake fluid pressure retaining unit RU is normal (including the condition that the driving circuit of the solenoid valve SV (FIG. 1) in the brake fluid pressure retaining unit RU is normal), and that the positioning switch PSW is in the D range. When all the above five conditions are satisfied, the driving force is decreased. Since the driving force reduction apparatus reduces the driving force, deteriorated fuel consumption of the vehicle is prevented. When the vehicle stops and is in the weak creep, the CVT ECU 6 judges the conditions for the strong creep. When the conditions for the strong creep are satisfied, the CVT ECU 6 sends an order to the CVT 3 for increasing the engaging force of the clutch, thereby increasing the creep driving force. Further, when the failure-detecting unit DU detects malfunction of the brake fluid pressure retaining unit RU, the operation of the driving force reduction apparatus is prohibited.

The driving motor stopping apparatus equipped in the vehicle comprises the FI/MG ECU 4. The driving motor stopping apparatus automatically turns off the engine 1 when the vehicle stops. At the MG ECU of the FI/MG ECU 4 the driving motor stopping apparatus judges the conditions for automatically turning off the engine such as the vehicle speed of 0 km/h. The automatic stop conditions of the engine will be described later. When all of the automatic stop conditions of the engine are satisfied, the FI/MG ECU 4 sends an engine stop order to the engine 1 so as to automatically turn off the engine 1. Since the driving motor stopping apparatus automatically turns off the engine, deteriorated fuel consumption of the vehicle is prevented.

The MG ECU of the FI/MG ECU 4 judges the automatic actuation conditions of the engine while the driving motor stopping apparatus automatically turns off the engine 1. When all of the automatic actuation conditions of the engine are satisfied, the FI/MG ECU 4 sends an engine actuation order to the MOT ECU 5. The MOT ECU 5 further transmits an engine actuation order to the motor 2. The motor 2 then automatically actuates the engine 1, and at the same time the strong creep is exerted on the vehicle. The automatic actuation conditions of the engine will be described later. Further, when the failure-detecting unit DU detects malfunction of the brake fluid pressure retaining unit RU, the operation of the driving motor stopping apparatus is prohibited.

Signals to be transmitted and received in this system will be described. With reference to FIG. 3, the letter "F_" in front of each signal indicates that the signal is flag information, which is either 0 or 1. The letter "V_" indicates that the signal is numerical information (unit is optional), and the letter "I_" indicates that the signal includes plural kinds of information.

A signal transmitted from the FI/MG ECU 4 to the CVT ECU 6 will be described. V_MOTTRQ represents output torque value. F_MGSTB is a flag showing whether all of the engine stop conditions (hereinafter described) except for the five conditions of F_CVTOK are satisfied. If all the conditions are satisfied, the numeral 1 is given, and if not, the numeral 0 is given. When the F_MGSTB and the F_CVTOK are both turned to 1, the engine 1 is automatically turned off. When one of these flags is turned to 0, the engine 1 is automatically turned on.

A signal transmitted from the FI/MG ECU 4 to the CVT ECU 6 and the MOT ECU 5 will be described. V_NEP represents engine speed.

A signal transmitted from the CVT ECU 6 to the FI/MG ECU 4 will be described. F_CVTOK is a flag showing whether five conditions are satisfied, the conditions of which includes (1) the CVT 3 is in weak creep, (2) ratio of the CVT 3 (pulley ratio) is low, (3) oil temperature of the CVT 3 is over a certain value, (4) temperature of the brake fluid is over a certain value, and (5) the brake fluid pressure retaining unit RU is normal (including the condition that the driving circuit of the solenoid valve SV (FIG. 1) in the brake fluid pressure retaining unit RU is normal). When all of the five conditions are satisfied, the numeral 1 is given, and if not, the numeral 0 is given. While the engine 1 is turned off, the above conditions (1) to (4) are maintained and the F_CVTOK is judged merely from the condition (5) that is whether the brake fluid pressure retaining unit RU is normal. When the engine 1 is turned off and the brake fluid pressure retaining unit RU is normal, the F_CVTOK is 1. When the brake fluid pressure retaining unit RU is out of order, the F_CVTOK is 0.

F_CVTTO is a flag showing a condition whether oil temperature of the CVT 3 is over a certain value. If the oil temperature is at the certain value or more, the numeral 1 is given, and if the oil temperature is below the value, the numeral 0 is given. Oil temperature of the CVT 3 is obtained from electrical resistance value of the linear solenoid controlling the hydraulic pressure of the clutch in the CVT 3. F_POSR is a flag showing a condition whether the positioning switch PSW is selected in the R range. If the positioning switch PSW selects the R range, the numeral 1 is given, and if not, the numeral 0 is given. F_POSDD is a flag showing a condition whether the positioning switch PSW selects the D range and the mode switch MSW selects the D mode. If the D range and the D mode (D range/D mode) are selected, the numeral 1 is given, and if not, the numeral 0 is given. When the FI/MG ECU 4 does not receive any information indicating the D range/D mode, R range, P range or the N range, the FI/MG ECU 4 judges either the D range/S mode or the L range is selected.

A signal transmitted from the engine 1 to the FI/MG ECU 4 and the CVT ECU 6 will be described. V_ANP represents negative pressure value at the intake pipe of the engine 1. V_TH represents throttle angle. V_TW represents temperature of the cooling water at the engine 1. V_TA represents intake temperature of the engine 1. Temperature of the brake fluid within the brake fluid pressure retaining unit RU, which is disposed within the engine compartment is obtained from the intake temperature. This is because both temperatures change with respect to the temperature at the engine compartment.

A signal transmitted from the CVT 3 to the FI/MG ECU 4 and the CVT ECU 6 will be described. V_VSP1 represents vehicle speed pulse from one of the two vehicle speed pickups provided in the CVT 3. Vehicle speed is calculated based on the vehicle speed pulse.

A signal transmitted from the CVT 3 to the CVT ECU 6 will be described. V_NDRP represents pulse showing the number of revolutions of the drive pulley provided at the CVT 3. V_NDNP represents pulse showing the number of revolutions of the driven pulley provided at the CVT 3. V_VSP2 represents vehicle speed pulse from the other vehicle speed pickup at the CVT 3. The V_VSP2 is more accurate than the V_VSP1, and the V_VSP2 is used for calculating the amount of clutch slipping at the CVT 3.

A signal transmitted from the MOT ECU 5 to the FI/MG ECU 4 will be described. V_QBAT represents remaining capacity of the battery. V_ACTTRQ represents output torque value of the motor 2, which is the same as the V_MOTTRQ. I_MOT represents information such as the amount of generated energy of the motor 2 showing electric loading. The motor 2 generates all the electric power consumed for the vehicle including the electric power for driving the motor.

A signal transmitted from the FI/MG ECU 4 to the MOT ECU 5 will be described. V_CMDPWR represents output required value to the motor 2. V_ENGTRQ represents output torque value of the engine 1. I_MG represents information such as the actuation mode, assist mode and the regeneration mode with respect to the motor 2.

A signal transmitted from the master power MP to the FI/MG ECU 4 will be described. V_M/PNP represents negative pressure detected value at a constant pressure chamber of the master power MP.

A signal transmitted from the positioning switch PSW to the FI/MG ECU 4 will be described. N or P is transmitted as positioning information when the positioning switch PSW selects either the N range or the P range.

A signal transmitted from the CVT ECU 6 to the CVT 3 will be described. V_DRHP represents hydraulic pressure command value to the linear solenoid valve, which controls the hydraulic pressure within the cylinder of the drive pulley at the CVT 3. V_DNHP represents hydraulic pressure command value to the linear solenoid valve, which controls the hydraulic pressure within the cylinder of the driven pulley at the CVT 3. The transmission gear ratio of the CVT 3 is changed by the V_DRHP and the V_DNHP. V_SCHP represents hydraulic pressure command value to the linear solenoid valve, which controls the hydraulic pressure of the clutch at the CVT 3. The engaging force of the clutch is changed by the V_SCHP.

A signal transmitted from the CVT ECU 6 to the brake fluid pressure retaining unit RU will be described. F_SOLA is a flag for the ON/OFF operation of the solenoid valve SVA (FIG. 1) in the brake fluid pressure retaining unit RU, in which 1 is for turning on, while 0 is for turning off. F_SOLB is a flag for the ON/OFF operation of the solenoid valve SVB (FIG. 1) in the brake fluid pressure retaining unit RU, in which 1 is for turning on and 0 is for turning off.

A signal transmitted from the positioning switch PSW to the CVT ECU 6 will be described. The positioning switch PSW selects the N range, P range, R range, D range or the L range, and the selected range is transmitted as positioning information.

A signal transmitted from the mode switch MSW to the CVT ECU 6 will be described. The mode switch MSW selects either the D mode (normal running mode) or the S mode (sports running mode), and the selected mode is transmitted as mode information. The mode switch MSW is a mode selection switch, which works when the positioning switch PSW is set in the D range.

A signal transmitted from the brake switch BSW to the FI/MG ECU 4 and the CVT ECU 6 will be described. F_BKSW is a flag showing the condition whether the brake pedal BP is depressed (ON) or depression of the brake pedal BP is released (OFF). If the brake pedal BP is depressed, the numeral 1 is given, and if depression of the brake pedal BP is released, the numeral 0 is given. As mentioned above, the signal may be a flag showing the condition whether the driver's foot is placed on the brake pedal BP (ON) or not (OFF).

<Conditions for Retaining Brake Fluid Pressure>

In the vehicle having the above system configuration, conditions that brake fluid pressure is retained by the brake fluid pressure retaining unit RU will be described. As shown in FIG. 4A, such conditions includes (I) the driving force of the vehicle is in weak creep and (II) the vehicle speed becomes 0 km/h. When these conditions are satisfied, the two solenoid valves SV, SV (solenoid valves SVA, SVB) are both switched to the shut-off position, thereby retaining brake fluid pressure within the wheel cylinder WC. The driving force turns to the weak creep (F#WCRON=1) after a weak creep order (F#WCRP=1) is transmitted. Switch to the creep condition is carried out by the CVT 3.

(I) "Weak creep" is required for the reason that the driver has to forcefully depress the brake pedal BP on a slope. The driver can stop the vehicle on the slope without forcefully depressing the brake pedal BP since in strong creep sufficient driving force can be obtained so as to keep the vehicle stationary on the slope at an inclination angle of 5 degrees. Therefore, the driver may have been slightly depressing the brake pedal BP. In this circumstance, if the solenoid valve SV is switched to the shut-off position and the engine is turned off, the vehicle will unintentionally displace backward.

(II) "the vehicle speed of 0 km/h" is required since the driver can not select a position for stopping the vehicle if the solenoid valve SV is closed when the vehicle is running.

[I. Conditions Required for Weak Creep Order]

As shown in FIG. 4A, a weak creep order is transmitted when all the following conditions are satisfied, i.e., (1) the brake fluid pressure retaining unit RU is normal, (2) temperature of the brake fluid is over a certain value (F_BKTO), (3) the brake pedal BP is depressed and the brake switch BSW is ON (F_BKSW), (4) vehicle speed is under 5 km/h (F_VS), and (5) the positioning switch PSW is in the D range (F_POSD). As mentioned before, the reason that the driving force is kept in weak creep is for reminding the driver of depressing the brake pedal BP forcefully. However, this is also for improving fuel consumption.

These five conditions (1) to (5) will be described below.

(1) The weak creep order is not transmitted when the brake fluid pressure retaining unit RU is not normal. If the weak creep order is transmitted irrespective of abnormal conditions, for example the solenoid valve SV is not switched to the shut-off position, and the vehicle becomes in weak creep, the vehicle will unintentionally displace backward on a slope after the driver releases the brake pedal BP. This is because brake fluid pressure is not retained within the wheel cylinder WC and braking force is suddenly lost after releasing the brake pedal BP. Therefore, a smooth starting operation on the slope without unintentional backward displacement of the vehicle is achieved by the strong creep condition of the vehicle.

(2) The weak creep order is not transmitted when the temperature of the brake fluid is less than a certain value. If the brake fluid pressure retaining unit RU actuates irrespective of low brake fluid temperatures, and the solenoid valve SV is closed, reduction speed of the brake fluid pressure within the wheel cylinder WC will be too slow after partly releasing the brake pedal BP. When the brake pedal BP is loosened, the brake switch BSW is still ON and the solenoid valve SV is continuously kept closed. Therefore, the brake fluid is merely discharged through the narrow restriction D. Further , if the temperature of the brake fluid is low, the viscosity thereof is high and the brake fluid doses not flow at a desired speed. For this reason, the braking force is kept strong continuously.

As mentioned above, when the brake fluid is at low temperatures, the vehicle is kept in the strong creep condition and is prohibited to be in the weak creep condition so as to prevent the vehicle from unintentional backward displacement. If the strong creep condition is maintained, the brake fluid pressure retaining unit RU does not actuate and the solenoid valve SV is not switched to the shut-off position.

As to the brake fluid pressure retaining unit RU without the restriction D in the brake fluid pressure circuit BC, such as the brake fluid pressure retaining unit RU comprising a servo valve for controlling degrees of valve opening, management of the brake fluid temperature is not so important. Also, in the case of the brake fluid pressure retaining unit RU having a mechanism for restricting the recovering speed of the brake pedal BP, management of the brake fluid temperature is not so important. Therefore, when the brake fluid temperature is not sufficiently high, the weak creep order can be transmitted.

(3) The weak creep order is not transmitted when the brake pedal BP is not depressed (F#BKSW). This is because the driver does not intend reduction of the driving force.

(4) The weak creep order is not transmitted when the vehicle speed is at 5 km/h or more. This is because driving force of the driving wheels 8,8 is transmitted to the engine 1 or the motor 2 through the clutch so as to obtain engine brake or carry out regenerative power generation by the motor.

(5) When the positioning switch PSW is in the R range or L range and is not in the D range, the weak creep order is not transmitted. This is for facilitating steering operation of the vehicle at a garage with the vehicle kept in the strong creep condition.

Judgment whether the vehicle is in the weak creep or not is carried out based on the hydraulic pressure command value with respect to the clutch of the CVT. The flag F_WCRPON showing the weak creep condition is maintained until the vehicle again becomes in the strong creep condition.

[II. Conditions Required for Automatically Turning off the Engine]

Figure 4B:
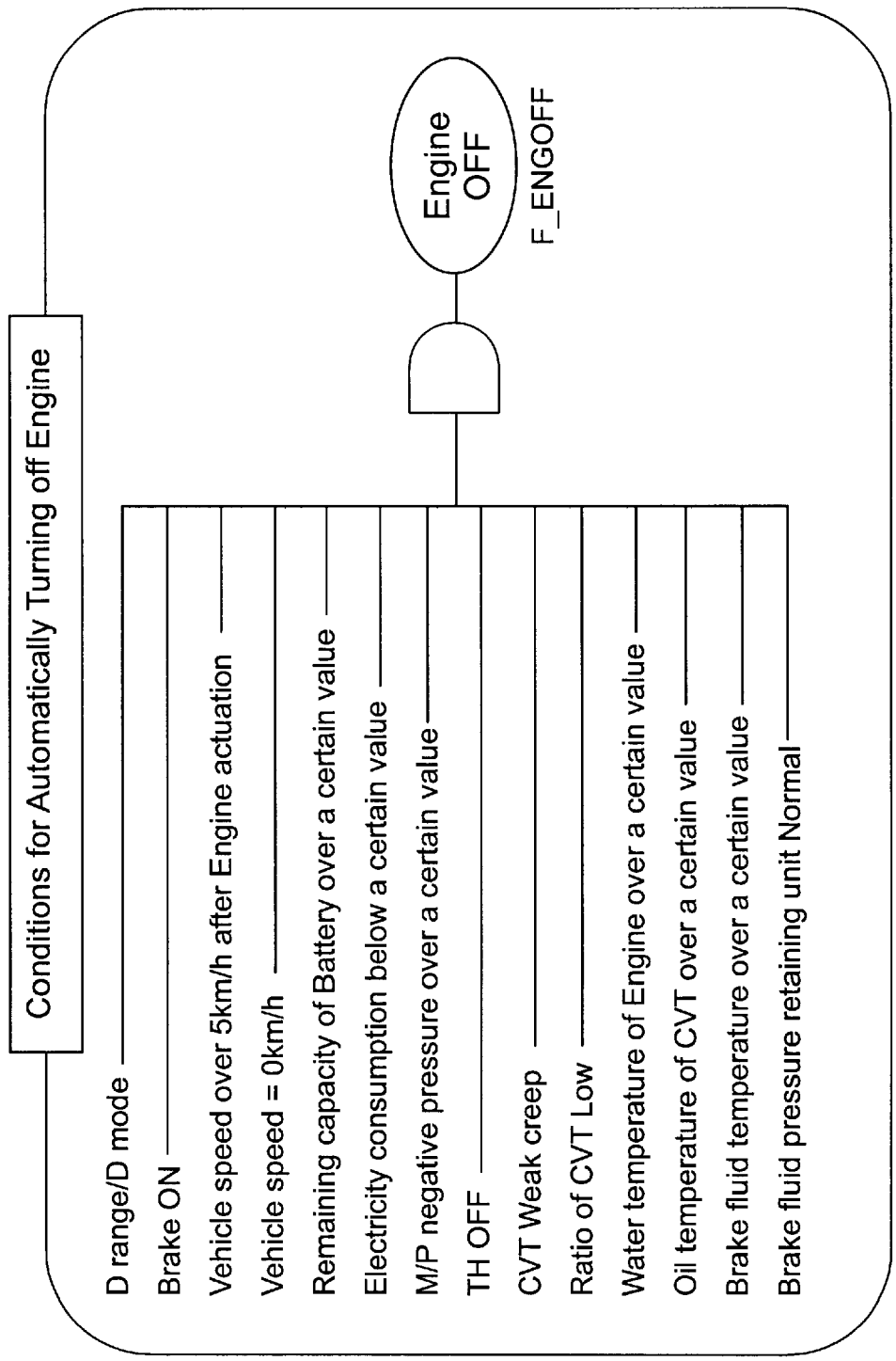

These conditions are not directly related to the conditions for retaining brake fluid pressure. However, in order to improve fuel consumption, the driving motor automatic stopping apparatus automatically turns off the engine 1 while the vehicle stops. Conditions required for automatically turning off the engine 1 will be described below. When all the following conditions are satisfied, the engine stop order (F_ENGOFF) is transmitted and the engine is automatically turned off (FIG. 4B).

(1) The positioning switch PSW selects the D range and the mode switch MSW selects the D mode (hereinafter referred to as "D range/D mode"). Except for the D range/D mode, the engine is not stopped as long as the ignition switch is turned off. This is because if the engine is stopped notwithstanding that the positioning switch PSW is in the P range or the N range, the driver may consider that the ignition switch is off and he may leave the vehicle.

When the positioning switch PSW selects the D range and the mode switch MSW selects the S mode (hereinafter referred to as "D range/S mode"), automatic turning off operation of the engine is not carried out. This is because the driver is expecting quick start operation of the vehicle in the D range/S mode. The engine 1 is not automatically stopped when the positioning switch PSW is in the L range or the R range. This is because the steering operation at the garage will be time-consuming if the engine stops frequently.

(2) The brake pedal BP is depressed and the brake switch BSW is ON. This is for warning the driver. The driver places his foot on the brake pedal BP when the brake switch BSW is ON. Therefore, if the engine 1 is stopped and the driving force is lost, the driver can easily increase a brake pedal load before the vehicle unintentionally displaces backward on a slope.

(3) After the engine is actuated, the vehicle speed is once reaches to 5 km/h. This is for facilitating the steering operation at the garage while the vehicle moves in the creep running. The steering operation at the garage will be time-consuming if the engine 1 is turned off whenever the vehicle stops for changing steering directions.

(4) Vehicle speed is 0 km/h. Driving force is not required when the vehicle stops.

(5) Capacity of the battery is more than a certain value. If the remaining capacity of the battery is not enough to restart the engine, the motor cannot actuate the engine after turning off the engine.

(6) Electricity consumption is below a certain value. This is for securing sufficient electrical supply to loads. The engine 1 can be stopped if the electricity consumption is below a certain value. (7) Load of the constant pressure chamber of the master power MP is over a certain value. Since negative pressure in the constant pressure chamber is obtained from the intake pipe of the engine 1, negative pressure in the constant pressure chamber becomes far smaller if the engine 1 is stopped at smaller negative pressures. This leads to reduced amplification of the brake load when the driver depresses the brake pedal BP, and hence resulting in deteriorated braking performance.

(8) The accelerator pedal is not depressed. Since the driver does not intend further increase of the driving force, the engine may be stopped.

(9) The CVT 3 is in weak creep. This is for reminding the driver of depressing the brake pedal BP forcefully so as to prevent the vehicle from unintentionally displacing backward after turning off the engine 1. While the engine actuates, backward displacement of the vehicle is prevented by the total amount of the braking force and the creep driving force. In the strong creep, the driver may insufficiently depress the brake pedal BP. Therefore, the vehicle is kept in weak creep condition before the engine 1 is turned off.

(10) Ratio of the CVT 3 is low. Unless the ratio of the CVT (pulley ratio) is low, the engine 1 is not automatically turned off. In order to achieve a smooth starting operation, the engine 1 is turned off when the ratio of the CVT 3 is low.

(11) Water temperature of the engine 1 is over a certain value. This is because turning on and turning off operation should be carried out when the engine 1 is in stable conditions. In cold area, if the water temperature is low, the engine 1 may not restart. Therefore, automatic turning off operation of the engine 1 is not carried out unless the water temperature is sufficiently high.

(12) Oil temperature of the CVT 3 is over a certain value. If the oil temperature of the CVT 3 is low, start-up for the hydraulic pressure of the clutch will cause a delay. Therefore, the required time from actuation of the engine 1 to the strong creep condition is extended, and the vehicle will displace backward on a slope. For this reason, the engine 1 is not turned off when the oil temperature of the CVT is low.

(13) Brake fluid temperature is over a certain value. This is because when the brake fluid temperature is low, flow resistance at the restriction D becomes larger and brake dragging will be caused. For this reason, the brake fluid pressure retaining unit RU is not actuated. Turning off the engine 1 and turning to the weak creep condition are restricted such that the vehicle is kept in the strong creep condition and is prevented from unintentional backward displacement. As to the brake fluid pressure retaining unit RU without the restriction D in the brake fluid pressure circuit BC, such as the brake fluid pressure retaining unit RU comprising a servo valve LSV for controlling degrees of valve opening, management of the brake fluid temperature is not so important.

(14) The brake fluid pressure retaining unit RU is normal. Since brake fluid pressure may not be retained if the brake fluid pressure retaining unit RU is out of order, the strong creep condition is kept for preventing the vehicle from unintentional backward displacement on a slope. The automatic engine stop operation is not carried out if the brake fluid pressure retaining unit RU is out of order. Meanwhile, if the brake fluid pressure retaining unit RU is normal, the engine 1 is automatically turned off.

<Conditions for Releasing Brake Fluid Pressure>

Figure 5A:
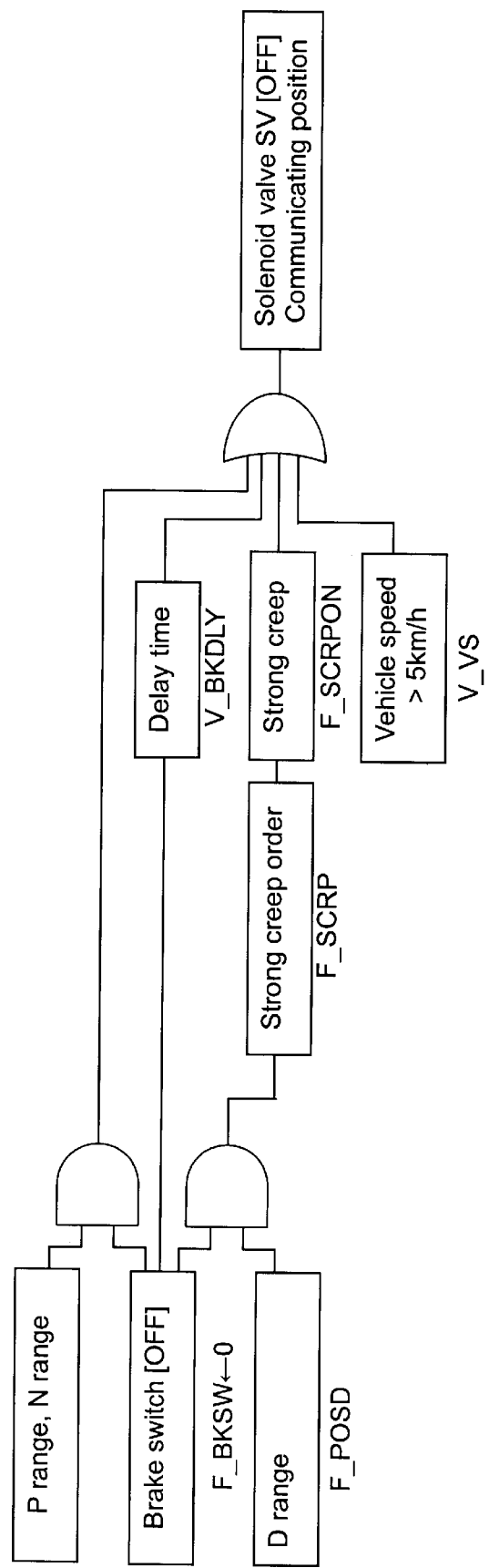

As shown in FIG. 5A, the solenoid valve SV in the shut-off position is switched to the communicating position for releasing the brake fluid pressure on condition that any of the following conditions is satisfied: (I) the positioning switch PSW is selected to a non-driving position such as P range or N range, and depression of the brake pedal BP is released (the brake switch is OFF), (II) a certain delay time has been passed after releasing the brake pedal BP, (III) driving force is in strong creep, and (IV) vehicle speed is over 5 km/h.

(I) In order to evade unnecessary operation of the brake fluid pressure retaining unit RU, the solenoid valve SV may be controlled so as to be switched to the communicating position when the positioning switch PSW is selected to a non-driving position such as P range. However, while the driver is releasing the brake pedal BP, brake fluid pressure within the wheel cylinder WC may become greater than that within the master cylinder MC. In such circumstances, if the solenoid valve SV is switched to the communicating position upon switching the positioning switch PSW, the driver may receive impact to his foot through the brake pedal BP due to pressure fluctuation.

According to the present invention, brake fluid pressure within the wheel cylinder WC is released after depression of the brake pedal is released (the brake switch BSW becomes OFF) and the solenoid valve SV is switched to the communicating position.

(II) Count of the delay time starts after depression of the brake pedal BP is released and the brake switch BSW is OFF. The delay time is about 2 to 3 seconds. As a fail-safe action, the solenoid valve SV is switched to the communicating position after a certain delay time has passed, thereby preventing brake dragging.

(III) The solenoid valve SV is switched to the communicating position when the driving force is in strong creep. Since the driving force in the strong creep condition enables the vehicle to park against a slope having an inclination angle of 5 degrees, there is no need to retain the brake fluid pressure within the wheel cylinder WC so as to prevent the vehicle from backward displacement. It is after transmission of the strong creep order (F_SCRP) that the driving force becomes in strong creep. The strong creep order is transmitted when the positioning switch PSW selects the D range and after depression of the brake pedal BP is released.

(IV) The solenoid valve SV is switched to the communicating position when the vehicle speed is over 5 km/h. This is for preventing brake dragging as a fail-safe action.

[Conditions for Automatically Turning off the Engine]

After automatically turning off the engine, the engine is automatically restarted in the following conditions. These conditions will be described with reference to FIG. 5B. The engine 1 is automatically actuated if any of the following conditions is satisfied.

(1) D range/D mode is kept and the brake pedal BP is released. Since this is considered that the driver initiated the starting operation, the engine is automatically actuated.

(2) D range/S mode is selected. When the D range/S mode is selected while the engine 1 has been automatically turned off in the D range/D mode, the engine 1 is automatically actuated. Since the driver is expecting a quick start of the vehicle in the D range/S mode, the engine 1 is automatically actuated irrespective of the brake pedal release.

(3) Accelerator pedal is depressed. This is because the driver is expecting the driving force by the engine 1.

(4) P range, N range, L range or R range is selected. When the P range is selected while the engine 1 has been automatically turned off in the D range/D mode, the engine 1 is automatically actuated. If the engine 1 is not automatically actuated upon switching to the P range or the N range, the driver may consider that the ignition switch was already turned off or that he does not have to turn off the ignition switch, and he may leave the vehicle. In order to prevent such a careless mistake and ensure fail-safe performance, the engine 1 is restarted when any of these ranges is selected. Meanwhile, the engine 1 is also automatically actuated when the L range or the R range is selected since such a switching operation is considered that the driver intends to start the vehicle.

(5) Remaining capacity of the battery is below a certain value. The engine 1 is not turned off unless the remaining capacity of the battery is over a certain value. However, capacity of the battery may lower after the engine 1 is automatically turned off. In this case, the engine 1 is automatically actuated for the purpose of the battery charge. The certain value is set to be higher than the critical battery capacity, below which the engine 1 is not actuated.

(6) Electricity consumption reaches to a certain value. While electricity consumers such as lights are working on, capacity of the battery decreases quickly. As a result, the engine 1 will not be restarted. For this reason, irrespective of the remaining capacity of the battery, the engine 1 is automatically actuated when the electricity consumption is over a certain value.

(7) Negative pressure of the master power MP is below a certain value. The lower the negative pressure at the master power MP, the less braking force is obtained. Therefore, the engine 1 is restarted for securing sufficient braking force.

(8) The brake fluid pressure retaining unit is out of order. When the solenoid valve SV or the driving circuit of the solenoid valve SV is out of order, the engine 1 is actuated and the driving force is kept in strong creep. If the engine 1 is turned off and failure is detected in the brake fluid pressure retaining unit RU comprising the solenoid valve SV, the engine 1 is immediately actuated such that the driving force is kept in strong creep. This is because brake fluid pressure may not be retained after releasing the brake pedal BP upon starting off the vehicle. In other words, the strong creep prevents the vehicle from unintentional backward displacement and facilitates a smooth starting operation of the vehicle.

<Time Chart for Control (1)>

Figure 6:
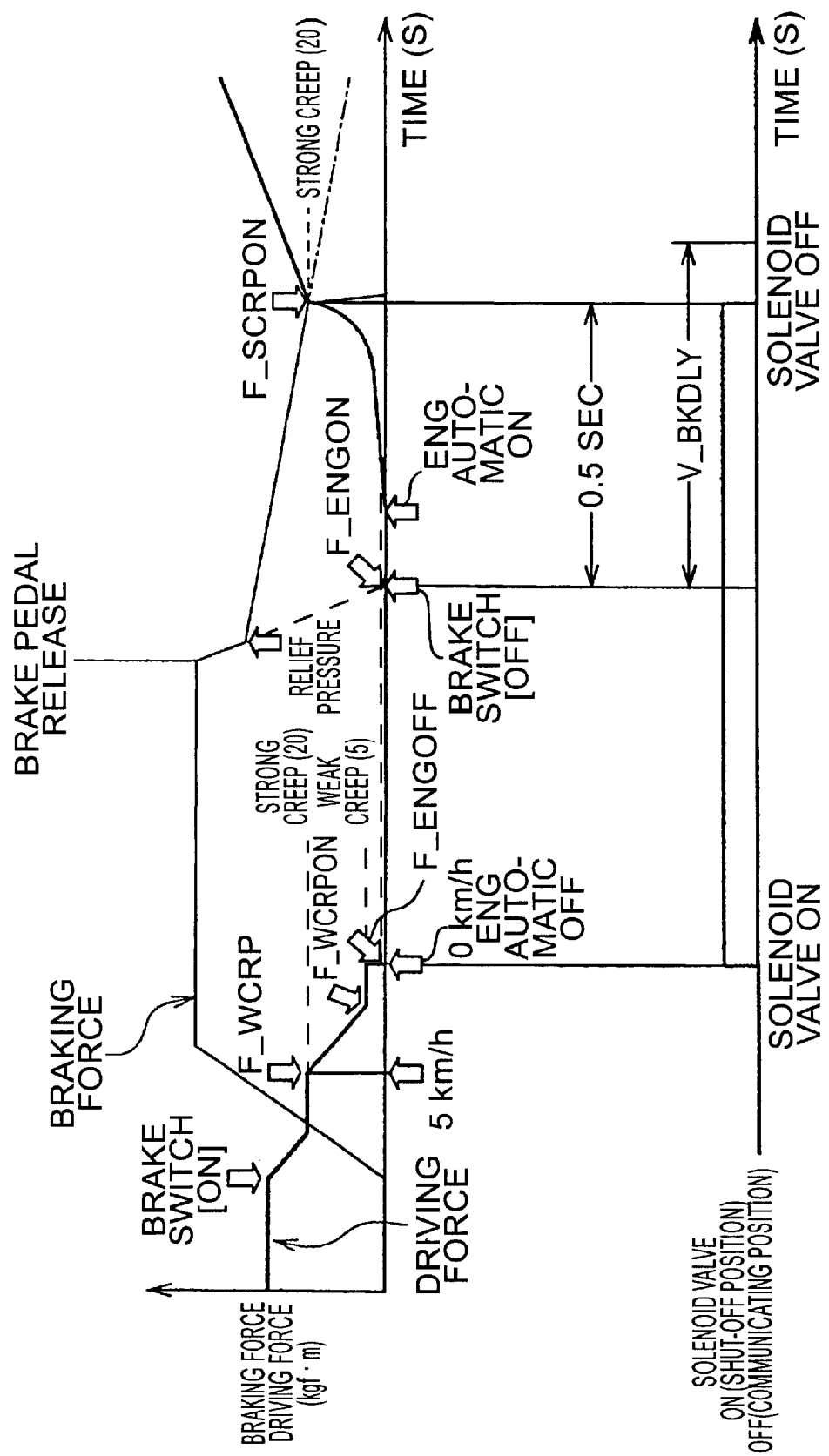
FIG. 6 is a time chart for the control of a vehicle including the brake fluid pressure retaining unit according to the present invention. Here, changes of driving force and braking force of the vehicle are shown together with positions of the solenoid valve. The driving force and the braking force are shown in time sequence order, i.e., braking, stopping and restarting the vehicle.

With reference to FIG. 6, the way of control will be described for the vehicle having the above system configuration. The positioning switch PSW and the mode switch MSW of the vehicle are not changed from the D range/D mode, and the vehicle is on the run. The, brake fluid pressure retaining unit RU is the same as that shown in FIG. 1, which comprises a restriction D, check valve CV and a relief valve RV.

Figure 7:
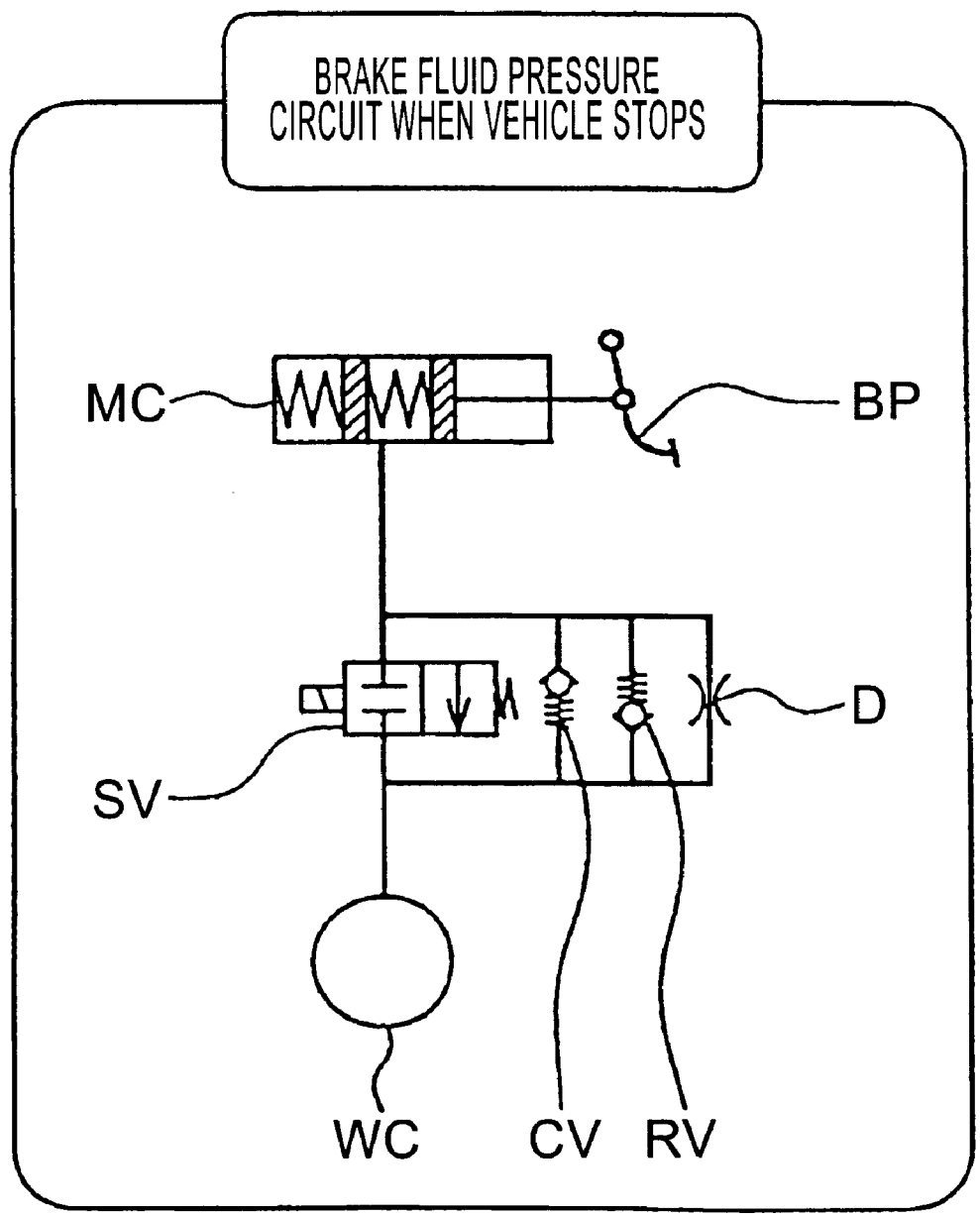
FIG. 7 shows a brake fluid pressure circuit of the vehicle shown in FIG. 6. The brake fluid pressure circuit corresponds to the condition when the vehicle stops.

In FIG. 6, the upper part of the time chart shows a relation in time sequence between driving force and braking force of the vehicle, in which a thick line indicates driving force and a thin line indicates braking force, and the lower part of the time chart shows ON/OFF conditions of the solenoid valve SV. FIG. 7 shows the brake fluid pressure circuit BC when the vehicle stops, in which the solenoid valve SV is ON (shut-off position).

As shown in FIG. 6, when the driver depresses the brake pedal BP while the vehicle is running (Brake switch [ON]), braking force is increasing. Since the driver releases the accelerator pedal when he depresses the brake pedal BP, the driving force is gradually decreasing until it is in strong creep (normal idling) in the end. When the driver continuously depresses the brake pedal BP and the vehicle speed decreases below 5 km/h, the weak creep order (F_WCRP) is transmitted. The driving force is reduced and is then turned to be in weak creep (F_WCRPON).

When the vehicle speed becomes 0 km/h, the solenoid valve SV is switched to the shut-off position and the engine 1 is automatically turned off (F_ENGOFF) so that driving force is lost. Brake fluid pressure is retained within the wheel cylinder WC while the solenoid valve SV is in the shut-off position. Meanwhile, since the engine 1 is turned off after the driving force becomes in the weak creep condition, the driver depresses the brake pedal BP in order to prevent unintentional backward displacement of the vehicle. Therefore, even if the engine 1 is automatically turned off, the vehicle does not displace backward (backward displacement restriction force). If the vehicle displaces backward, the driver additionally increases a brake pedal load by slightly depressing the brake pedal BP. Since the driver's foot is put on the brake pedal BP, the driver can easily depress the brake pedal BP additionally without any confusion. The automatic turning off operation of the engine 1 results in improved fuel economy and decreased amount of exhaust gas.

Conditions that the driving force becomes in weak creep, that the solenoid valve is switched to the shut-off position, and that the engine 1 is automatically turned off are the same as those previously described with reference to FIG. 4.

The driver then releases the brake pedal BP in order to stand by restart of the vehicle. As shown in FIG. 6, if the driver depresses the bake pedal BP more than the setting value of the relief valve RV (relief pressure), the relief valve RV works as soon as the driver releases the brake pedal BP such that the braking force decreases in a short time to the relief pressure. Provision of the relief valve RV ensures a smooth start operation of the vehicle on the slope even if the driver has been forcefully depressing the brake pedal BP.

When the brake pedal BP is fully released (Brake switch [OFF]), the automatic engine actuation order (F_ENGON) is transmitted. After a time lag derived from a delay of signal communication and mechanisms, the engine 1 is automatically actuated and the driving force increases until it becomes in strong creep (F_SCRPON). The time interval required for the strong creep after releasing the brake pedal (the brake switch BSW is Off) is about 0.5 seconds. Since the solenoid valve SV remains in the shut-off position during the interval, the brake fluid within the wheel cylinder WC flows into the master cylinder MC merely through the restriction D. Therefore, the braking force gradually reduces so as to prevent the backward displacement of the vehicle.

When the driving force becomes in the strong creep condition (F_SCRPON), the solenoid valve SV in the shut-off position is switched to the communicating position and the brake fluid pressure within the wheel cylinder WC is reduced at a time. This is because the braking force prevents a smooth starting operation of the vehicle and brake dragging is caused in the end. The vehicle accelerates further by additionally depressing the accelerator pedal.

Conditions that the driving force becomes in strong creep and that the solenoid valve SV is switched to the communicating position are the same as those previously described with reference to FIG. 5.

As shown in FIG. 6, a phantom line is extending downwardly from "Relief pressure" on the line indicating braking force. The phantom line indicates a case when the brake fluid pressure is not retained. In this case, since reduction of the braking force takes place immediately after decreasing the brake pedal load and the braking force is quickly lost, a smooth starting operation of the vehicle is not achieved. Meanwhile, on the line indicating braking force, a phantom line is extending downwardly from the point where the solenoid valve is in the communicating position. This phantom line indicates reduction of the braking force when the solenoid valve SV is not switched to the communicating position. If the braking force decreases along this phantom line, brake dragging would be caused. V_BKDLY in the lower part of FIG. 6 indicates delay time. In view of fail-safe performance, the solenoid valve SV is switched to the communicating position under any circumstances after a certain period of delay time has passed.

<Time Chart for Control (2)>

Figure 8:
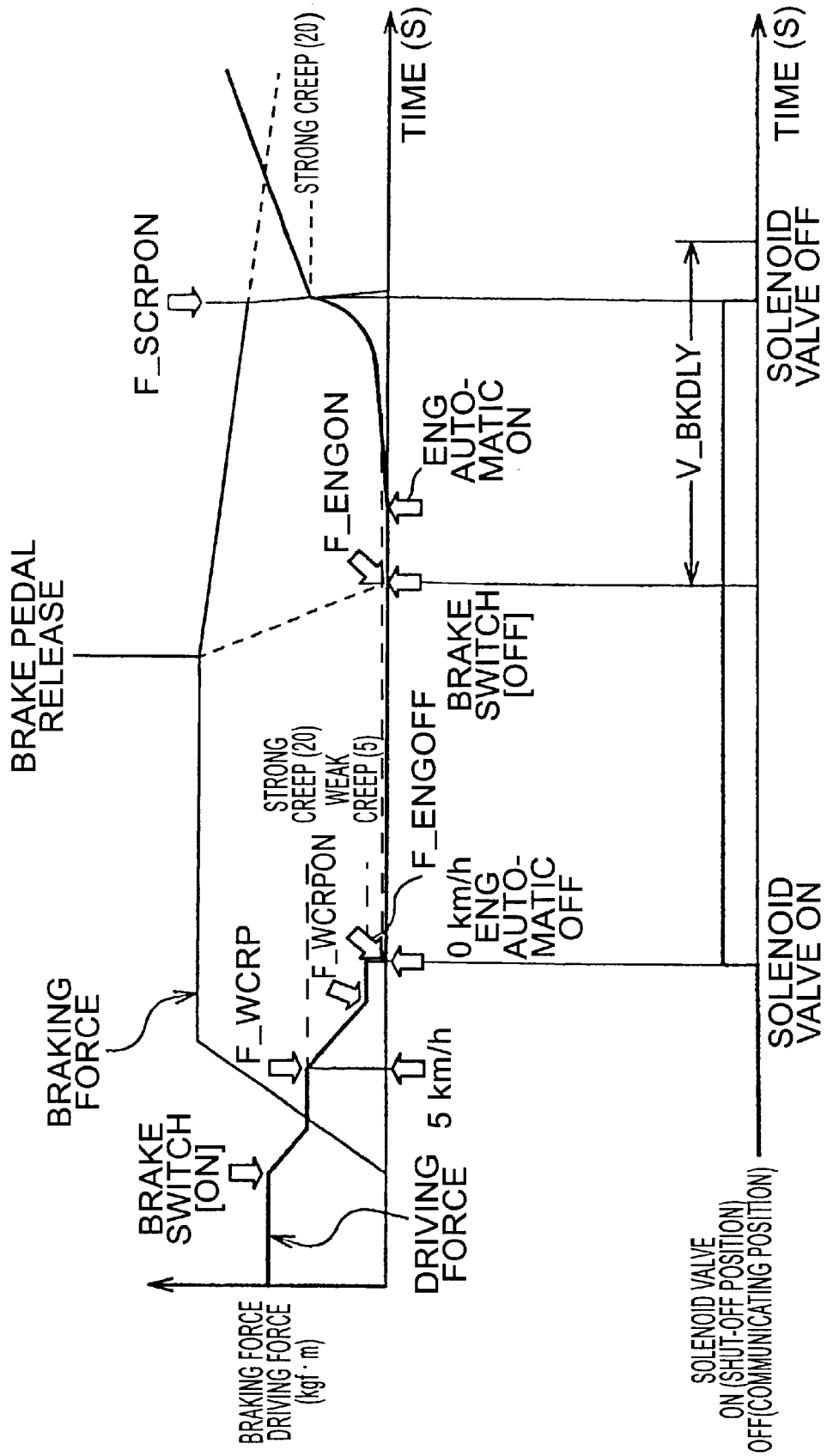
FIG. 8 is a time chart for the control of a vehicle without a relief valve, which corresponds to FIG. 6.

With reference to FIG. 8, the way of control will be described while the vehicle is on the run. The positioning switch PSW and the mode switch MSW of the vehicle are not changed from the D range/D mode. Not like the vehicle shown in <Time Chart for Control (1)>, the brake fluid pressure retaining unit RU does not comprise a relief valve RV.

Figure 9:
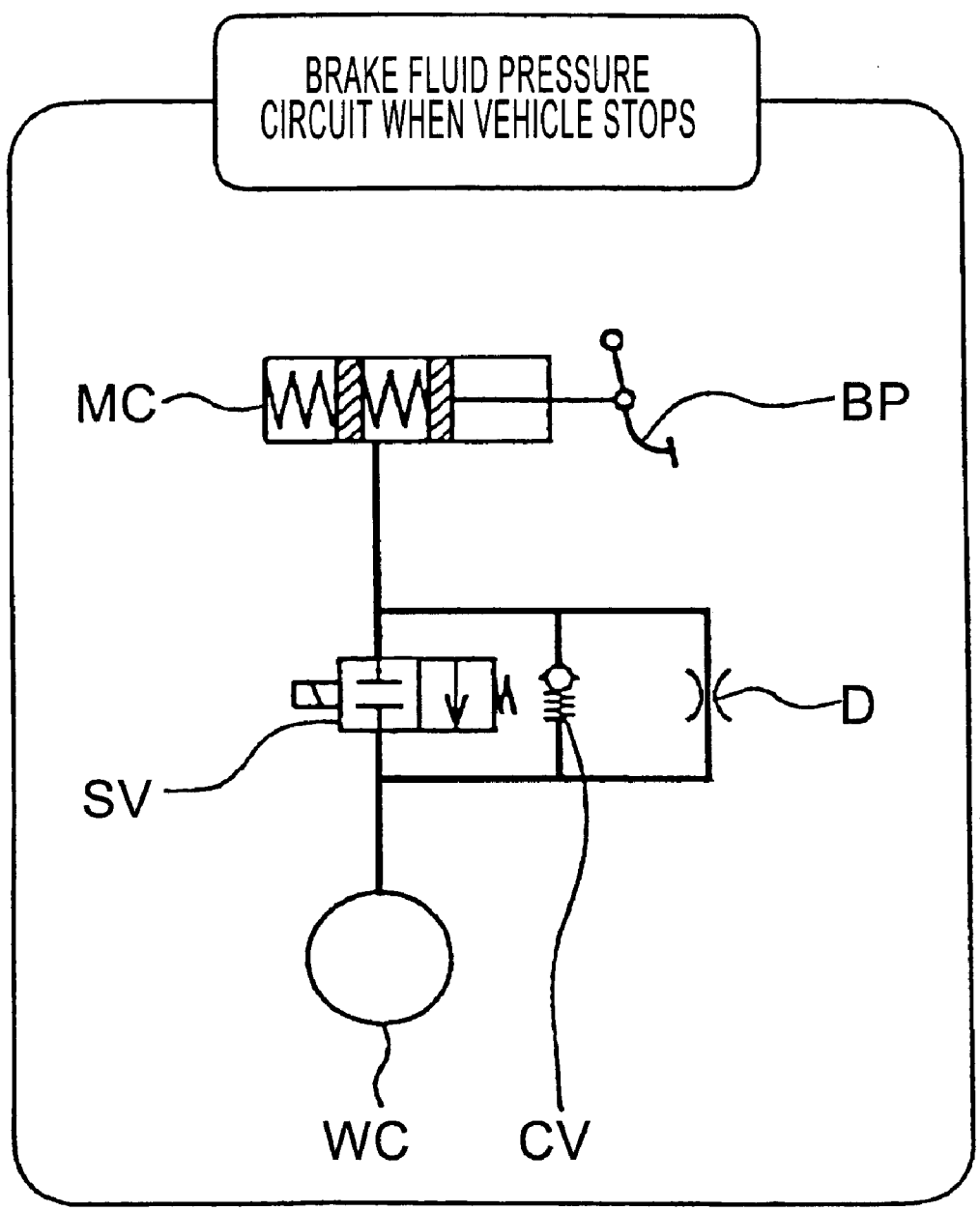
FIG. 9 shows a brake fluid pressure circuit of the vehicle shown in FIG. 8. The brake fluid pressure circuit corresponds to the condition when the vehicle stops.

As shown in FIG. 8, the upper part of the time chart shows a relation in time sequence between driving force and braking force of the vehicle, in which a thick line indicates driving force and a thin line indicates braking force, and the lower part of the time chart shows ON/OFF conditions of the solenoid valve SV. FIG. 9 shows the brake fluid pressure circuit BC when the vehicle stops, in which the solenoid valve SV is ON (shut-off position).

The processes before releasing the brake pedal BP are the same as those described in <Time Chart for Control (1)>. Just before the brake pedal BP is released (Brake switch [OFF]), the solenoid valve SV is closed and the engine 1 is off. If the driver releases the brake pedal BP, the braking force gradually decreases since the brake fluid pressure retaining unit RU is not provided with the relief valve.

Meanwhile, when the brake pedal BP is released and the brake switch BSW is OFF, the automatic engine actuation order (F_ENGON) is transmitted. After a time lag derived from a delay of signal communication and mechanisms, the engine 1 is automatically actuated. Since such an operation is described in <Time Chart for Control (1)>, further explanation is omitted.

In this example, the braking force in the strong creep condition becomes greater, compared to the vehicle shown in <Time Chart for Control (1)>. This is because the brake fluid pressure retaining unit RU does not include a relief valve. However, since the solenoid valve SV is switched to the communicating position in the strong creep condition, the braking force is immediately lost, thereby preventing brake dragging. The time interval required for the strong creep after releasing the brake pedal (the brake switch BSW is OFF) is about 0.5 seconds. The vehicle accelerates further by additionally depressing the accelerator pedal.

As shown in FIG. 8, a phantom line is extending downwardly from the point "Brake pedal Release" on the line indicating braking force. The phantom line indicates a case when the brake fluid pressure is not retained. In this case, since the braking force is lost immediately, a smooth starting operation of the vehicle is not achieved. Meanwhile, on the line indicating braking force, a phantom line is extending downwardly from the point where the solenoid valve is in the communicating position. This phantom line indicates reduction of the braking force when the solenoid valve SV is not switched to the communicating position. If the braking force decreases along this phantom line, brake dragging would be caused. V_BKDLY in the lower part of the figure indicates delay time. In view of fail-safe performance, the solenoid valve SV is switched to the communicating position under any circumstances after a certain period of delay time has passed. This is the same as described in <Time Chart for Control (1)>.

Accordingly, even if the brake fluid pressure retaining unit RU does not includes a relief valve RV, a smooth starting operation of the vehicle on the slope can be achieved.

<Time Chart for Control (3)>

Figure 10:
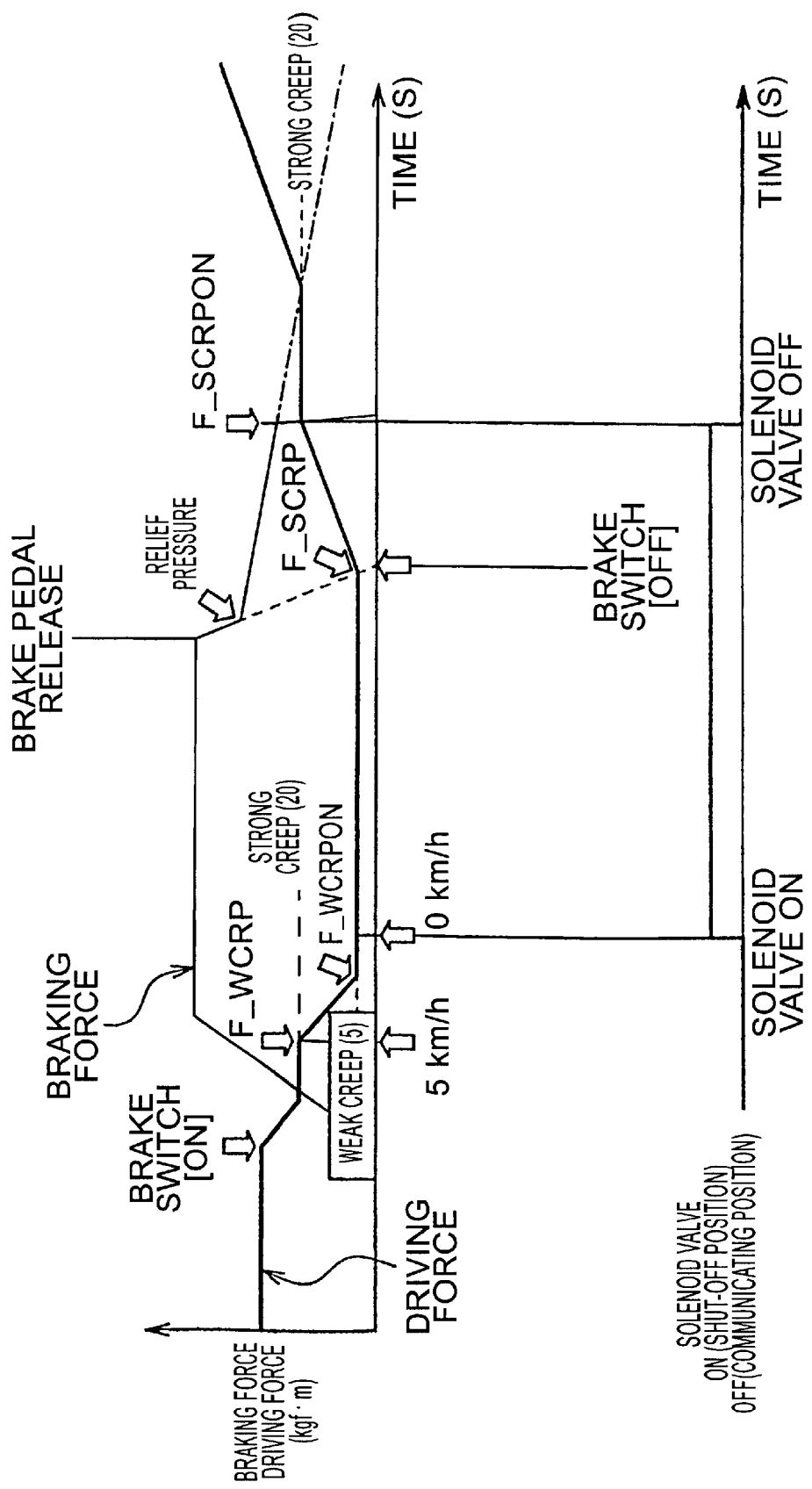
FIG. 10 is a time chart corresponding to FIG. 6, in which the engine is not automatically turned off when the vehicle stops.

With reference to FIG. 10, the way of control will be described while the vehicle is on the run. The positioning switch PSW and the mode switch MSW are not changed from the D range/D mode. The brake fluid pressure retaining unit RU comprises a relief valve RV. Not like the vehicles shown in <Time Chart for Control (1)> and <Time Chart for Control (2)>, the vehicle is not controlled such that the engine 1 is automatically turned off when the vehicle stops.

As shown in FIG. 10, the upper part of the time chart shows a relation in time sequence between driving force and braking force of the vehicle, in which a thick line indicates driving force and a thin line indicates braking force, and the lower part of the time chart shows ON/OFF conditions of the solenoid valve SV.

Since the processes before the vehicle stops are the same as those described in <Time Chart for Control (1)> and the like, further explanation is omitted. The solenoid valve SV is in the shut-off position when the vehicle stops. While, the engaging force of the clutch is kept in weak creep after the vehicle stops. only a little driving force may be obtained in the weak creep condition, however consumption of fuel is saved in stead. It is the braking force that prevents the vehicle from backward displacement on the slope.

Conditions that the driving force becomes in weak creep and that the solenoid valve SV is switched to the shut-off position are the same as those previously described with reference to FIG. 4A.

The driver then releases the brake pedal BP in order to stand by restart of the vehicle. As shown in FIG. 10, if the driver depresses the bake pedal BP more than the relief pressure of the relief valve RV, the relief valve RV works as soon as the driver releases the brake pedal BP such that the braking force decreases in a short time to the relief pressure. Provision of the relief valve RV ensures a smooth start operation of the vehicle on the slope even if the driver has been forcefully depressing the brake pedal BP.

When the brake pedal BP is fully released (Brake switch [OFF]), the strong creep order (F_SCRP) is transmitted. The driving force increases until it becomes in the strong creep condition (F_SCRPON). Since the solenoid valve SV is in the shut-off position after the brake pedal BP is released and before the driving force becomes in strong creep, the brake fluid within the wheel cylinder WC flows into the master cylinder MC merely through the restriction D. Therefore, as disclosed in <Time Chart for Control (1)>, the braking force gradually reduces so as to prevent the backward displacement of the vehicle.

When the driving force becomes in the strong creep condition (F_SCRPON), the solenoid valve SV in the shut-off position is switched to the communicating position and the brake fluid pressure within the wheel cylinder WC is reduced at a time. This is because the braking force prevents a smooth starting operation of the vehicle and brake dragging is caused in the end. The vehicle accelerates further by additionally depressing the accelerator pedal.

Conditions that the driving force becomes in strong creep and that the solenoid valve SV is switched to the communicating position are the same as those previously described with reference to FIG. 5A.

Referring to FIG. 10, a phantom line which is extending downwardly from "Relief pressure" on the line indicating braking force, and a phantom line which is extending downwardly from the point where the solenoid valve SV is switched to the communicating position are the same as those described in <Time Chart for Control (1)>.

In the above-mentioned <Time Chart for Control (1)> to <Time Chart for Control (3)>, switching of the positioning switch PSW is not carried out while the vehicle stops. However, in <Time Chart for Control (4)> to <Time Chart for Control (6)> below, the positioning switch PSW is switched to a non-driving position such as P range (N range) by the shift lever while the vehicle stops.

<Time Chart for Control (4)~With Switching Operation of Positioning Switch>

Figure 11:
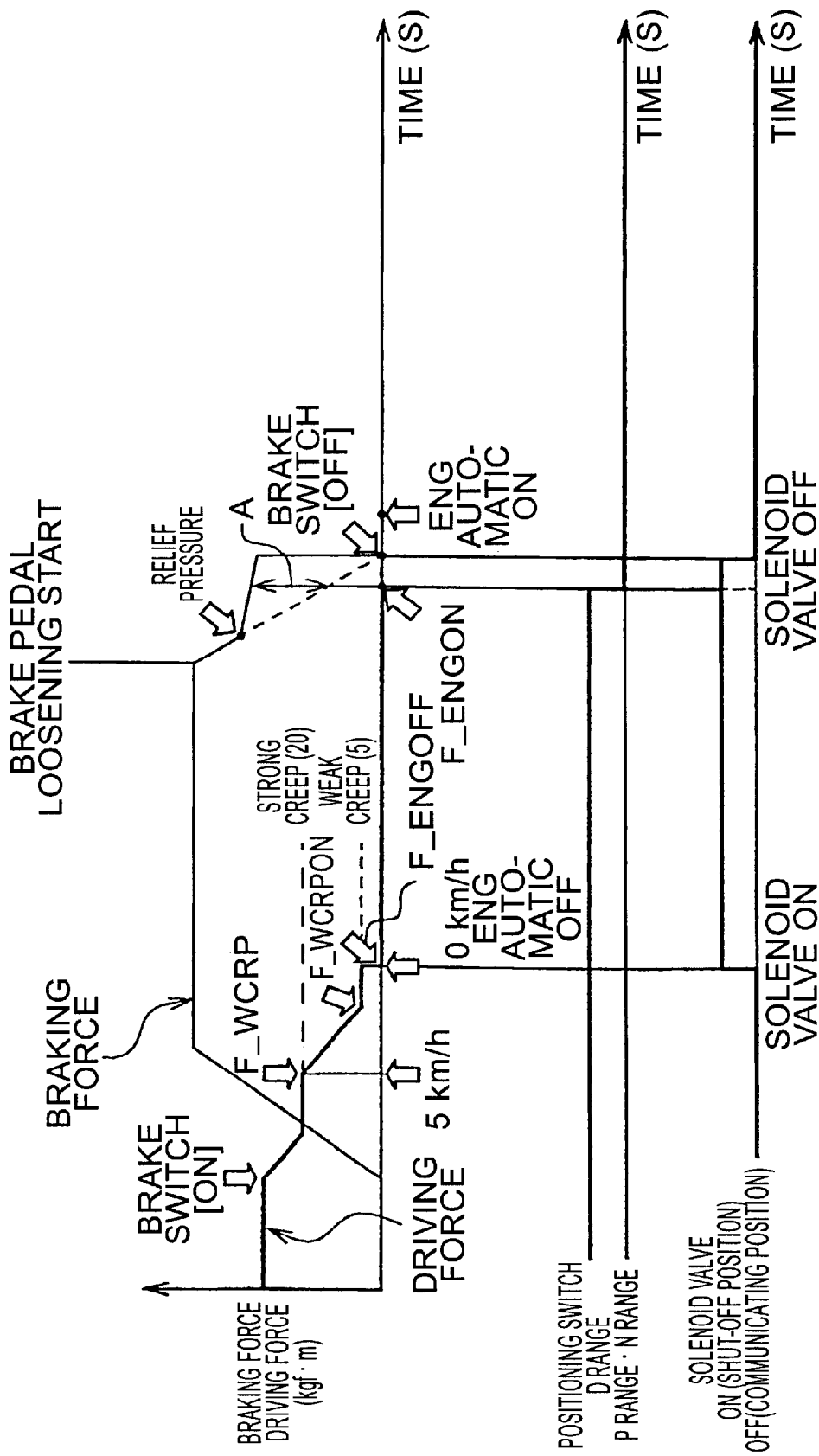
FIG. 11 is a time chart for the control of a vehicle including the brake fluid pressure retaining unit according to the present invention. Here, braking and stopping the vehicle and release of the brake pedal are shown in time sequence order.

With reference to FIG. 11, the way of control will be described while the vehicle is on the run. The vehicle in this chart is the same as that used in <Time Chart for Control (1)>. A difference from <Time Chart for Control (1)> is that the positioning switch PSW in this chart is switched from a driving position such as D range to a non-driving position such as P range (N range) while the vehicle stops.

As shown in FIG. 11, the upper part of the time chart shows a relation in time sequence between driving force and braking force of the vehicle, in which a thick line indicates driving force and a thin line indicates braking force. The middle part of the time chart shows range positions of the positioning switch PSW, in which D range is shown above P range and N range. The lower part of the time chart shows ON/OFF conditions of the solenoid valve SV.

Since the processes before the vehicle stops and the engine 1 is automatically turned off are the same as those described in <Time Chart for Control (1)>, further explanation is omitted. When do so, the positioning switch PSW selects D range, the solenoid valve is in the shut-off position and the brake switch BSW is ON.

When the driver leaves the vehicle after turning off the engine 1, depression of the brake pedal BP is released, and then the shift lever is moved so as to switch the positioning switch PSW from a driving position such as D range to a non-driving position such as P range (N range). The same operation may be carried out while the driver pulls up at a traffic light.

Figure 14A:
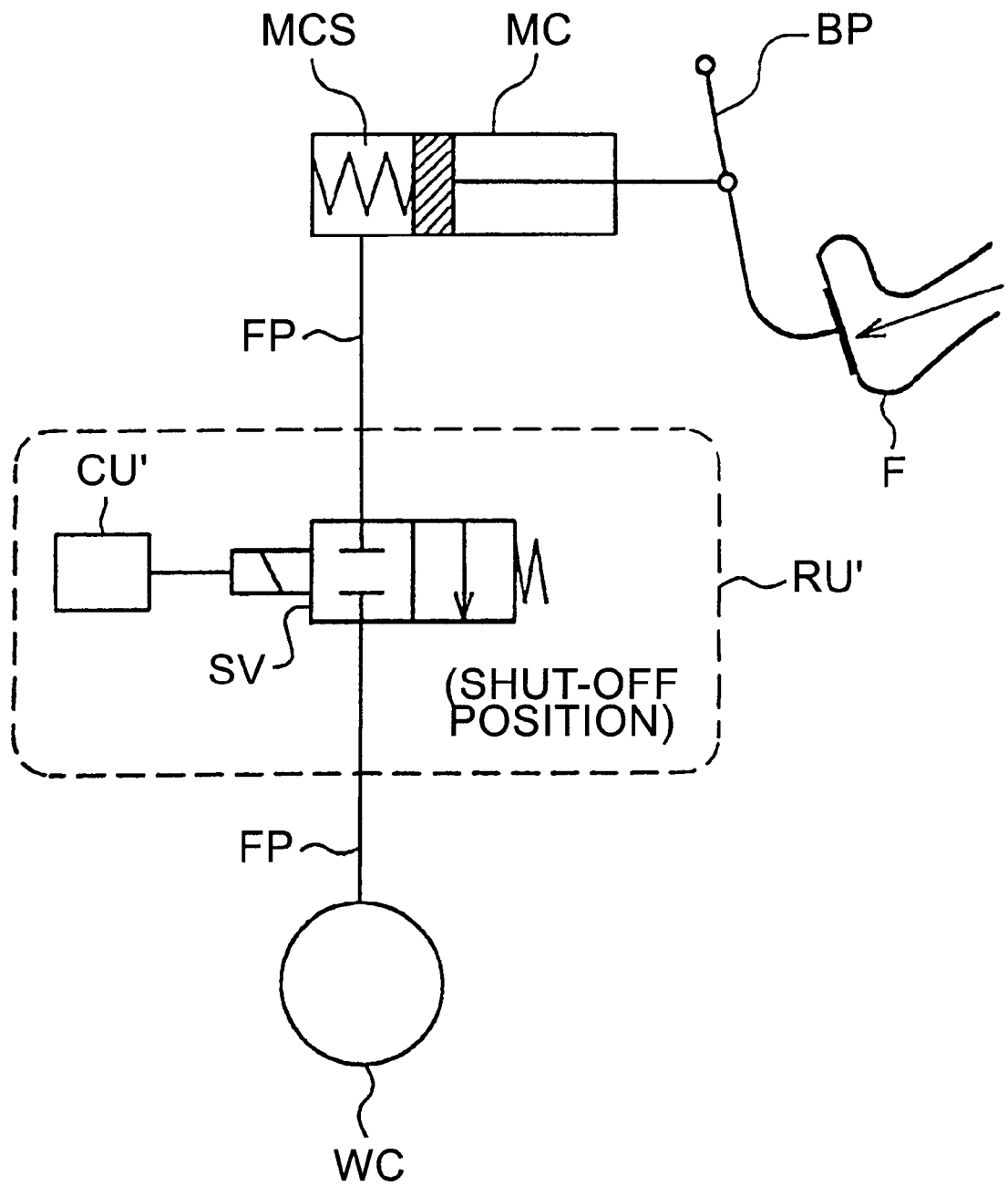

In the vehicle having a conventional brake fluid pressure retaining unit RU' (FIG. 14), no problem occurs if switching of the positioning switch PSW is carried out after releasing the brake pedal BP or while depressing the brake pedal BP. However, the driver often switches the positioning switch PSW while loosening the brake pedal BP.

If the driver switches the positioning switch PSW to P range (N range) while loosening the brake pedal BP, the solenoid valve SV is immediately switched to the communicating position (phantom line in the lower part of the time chart shown in FIG. 11). The driver then receives impact through his foot. The impact corresponds to the braking force A shown in the upper part of the time chart.

Reference numeral A in the upper part of the time chart shown in FIG. 11 denotes a difference of braking force, which is converted from a difference of brake fluid pressure between the master cylinder MC and the wheel cylinder WC when the positioning switch PSW is switched from D range to P range (N range). The reason for creating pressure difference between the master cylinder MC and the wheel cylinder WC after releasing the brake pedal BP has been described.

Meanwhile, in the vehicle having a brake fluid pressure retaining unit RU according to the present invention, the above-mentioned drawback does not occur since the solenoid valve SV remains in the shut-off position until depression of the brake pedal BP is released and the brake switch becomes OFF. In other words, if depression of the brake pedal BP is released, the driver's foot is not placed on the brake pedal BP, or otherwise the brake pedal has been returned to its original position.

It is when the brake switch BSW becomes OFF that pressure difference of the brake fluid pressure between the master cylinder MC and the wheel cylinder WC is the greatest. This is because the brake fluid pressure retaining unit RU retains brake fluid pressure within the wheel cylinder WC. When depression of the brake pedal BP is released and the solenoid valve SV is switched to the communicating position, the brake fluid retained within the wheel cylinder WC flows instantly to the master cylinder MC. However, if the brake pedal BP has been returned to its original position, the brake fluid may flow into a reservoir tank (not shown) connected to the master cylinder MC. Impact to the brake pedal BP is therefore eased. In other words, the reservoir tank functions as a shock absorber (buffer).

It may be considered that the driver receive impact to his foot when the relief valve RV works. However, since the brake fluid pressure within the wheel cylinder WC decreases through the relief valve RV in accordance with applied brake pedal load, there is no pressure difference between the master cylinder MC and the wheel cylinder WC. Therefore, the driver does not experience any impact through the brake pedal BP.

Automatic engine actuation order (F_ENGON) is transmitted when the positioning switch PSW is switched to a non-driving position such as P range (N range). After a time lag derived from a delay of signal communication and mechanisms, the engine 1 is automatically actuated (ENG Automatic On). As mentioned above, the engine 1 is automatically actuated so as to remind the driver of turning off the ignition switch.

Figure 5B:
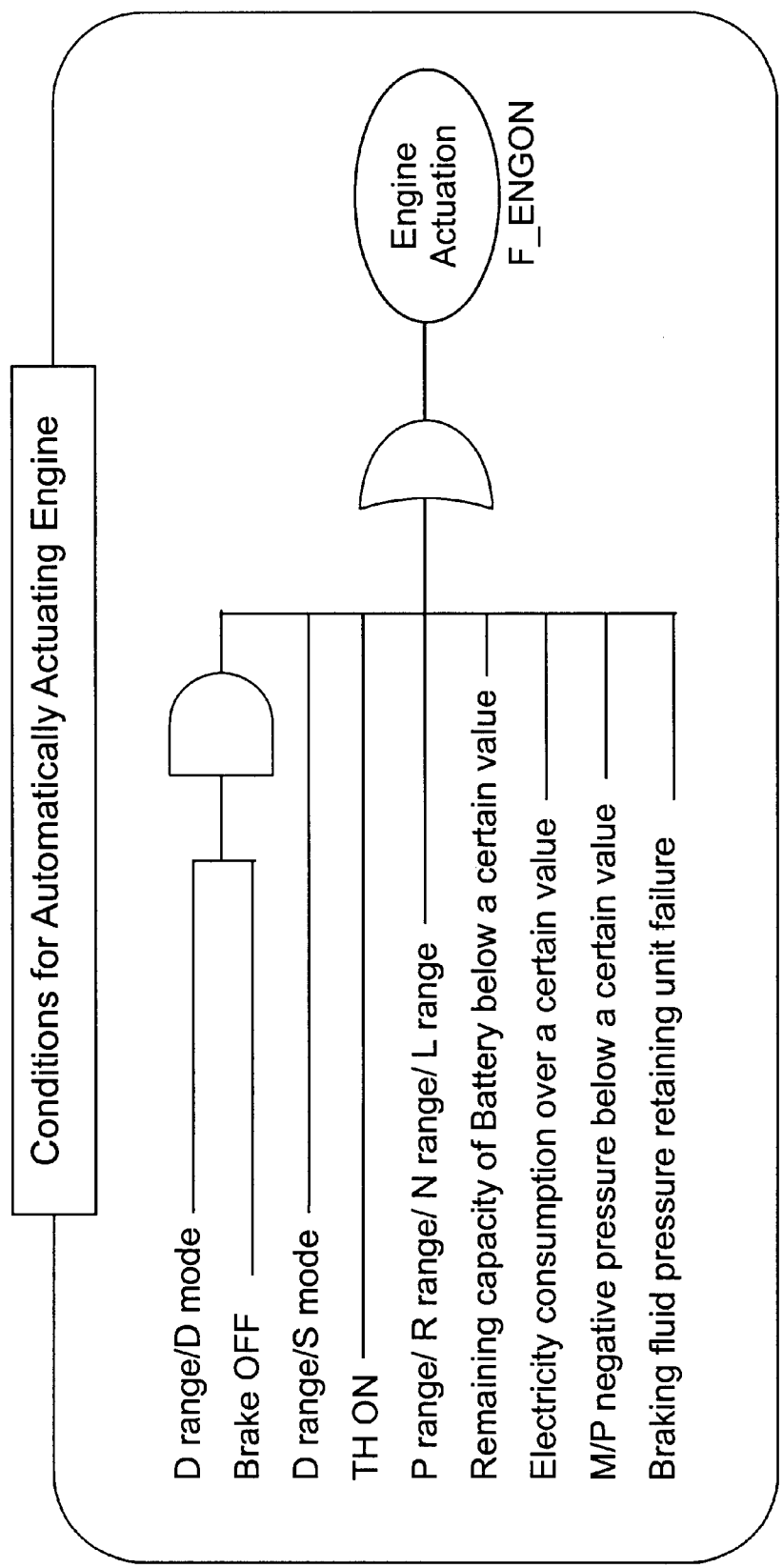

When the driver leaves the vehicle, he may consider that the positioning switch PSW does not have to be switched to a non-driving position such as P range (N range) since the engine 1 has been turned off. However, when depression of the brake pedal BP is released, the engine 1 is automatically actuated soon after the automatic engine actuation order is transmitted, thereby warning the driver (FIG. 5B).

<Time Chart for Control (5)~With Switching operation of Positioning Switch>

Figure 12:
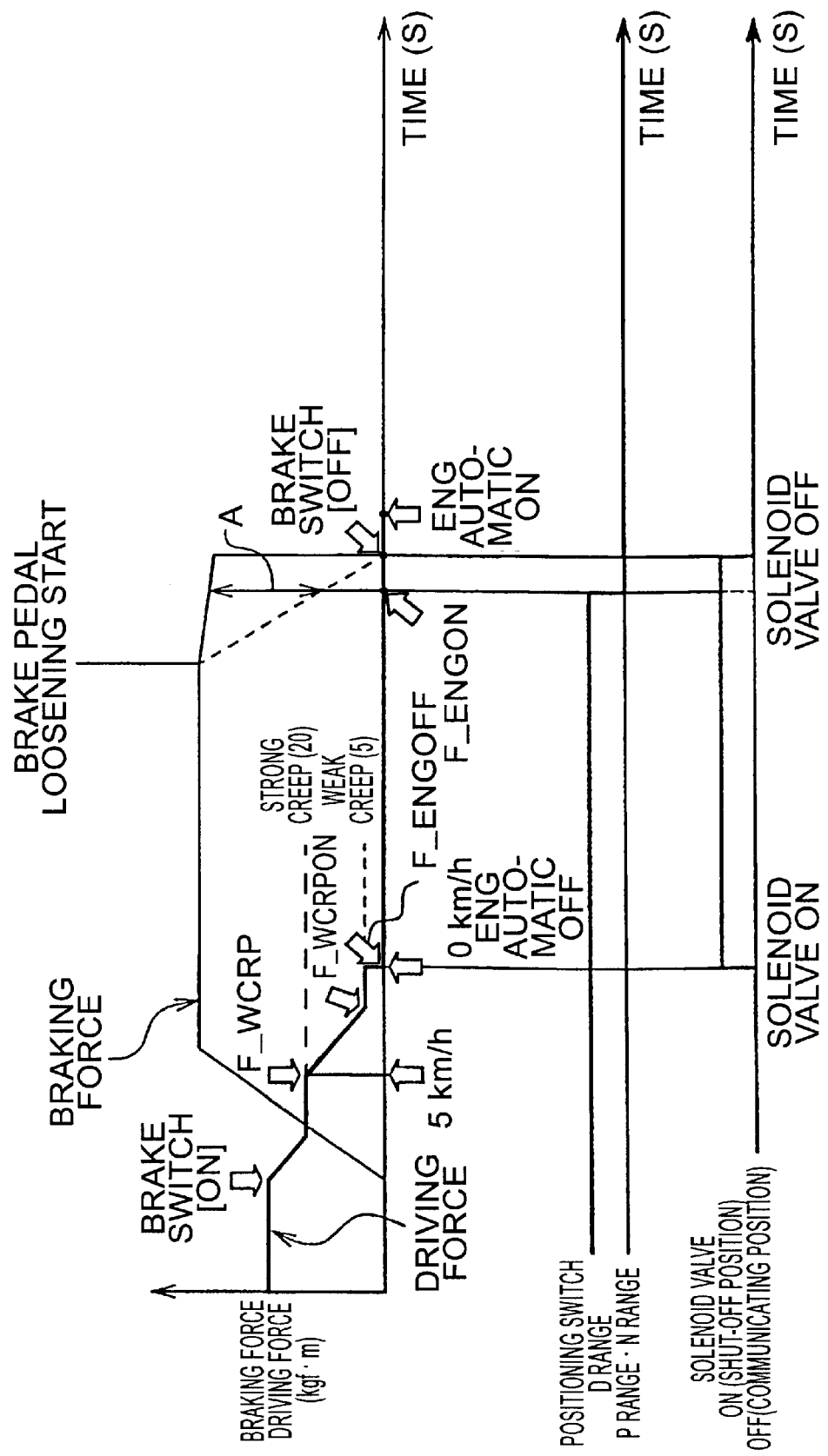
FIG. 12 is a time chart for the control of a vehicle without a relief valve, which corresponds to FIG. 11.

With reference to FIG. 12, the way of control will be described while the vehicle is on the run. The positioning switch PSW and the mode switch MSW of the vehicle are not changed from the D range/D mode. Not like the vehicle shown in <Time Chart for Control (4)>, the brake fluid pressure retaining unit RU does not comprise a relief valve RV.

As shown in FIG. 12, the upper part of the time chart shows a relation in time sequence between driving force and braking force of the vehicle, in which a thick line indicates driving force and a thin line indicates braking force. The middle part of the time chart shows range positions of the positioning switch PSW, in which D range is shown above P range and N range. The lower part of the time chart shows ON/OFF conditions of the solenoid valve SV.

The processes before the vehicle stops and the driver starts loosening the brake pedal are the same as those described in <Time Chart for Control (4)>. When do so, the positioning switch PSW selects D range, the solenoid valve is in the shut-off position and the brake switch BSW is ON.

When the driver starts loosening the brake pedal BP, the brake fluid pressure within the wheel cylinder WC (braking force) gradually decreases due to the restriction D of the brake fluid pressure retaining unit RU. Meanwhile, since the solenoid valve SV is in the shut-off position, the brake fluid pressure within the master cylinder MC decreases rapidly irrespective of the brake fluid pressure within the wheel cylinder WC (phantom line in the upper part of the time chart shown in FIG. 12). For this reason, pressure difference is made between the master cylinder MC and the wheel cylinder WC. As mentioned above, reference numeral A in the upper part of the time chart shown in FIG. 12 denotes braking force, which is converted from a difference of brake fluid pressure. However, the reference numeral A shown in FIG. 12 denotes greater braking force than that shown in <Time Chart for Control (4)> since the brake fluid pressure retaining unit RU does not comprise a relief valve RV. Accordingly, impact transmitted to the driver also becomes greater.

In the vehicle having a brake fluid pressure retaining unit RU according to the invention, however, impact is not transmitted to the driver's foot since the solenoid valve SV remains in the shut-off position if the positioning switch PSW is switched from D range to P range (N range) while loosening the brake pedal BP. The brake fluid pressure within the wheel cylinder WC is not released until the brake switch BS is OFF.

When the positioning switch PSW is switched from D range to P range (N range), the automatic engine actuation order (F_ENGON) is transmitted so as to automatically turn on the engine 1, thereby reminding the driver of turning off the ignition switch.

<Time Chart for Control (6)~With Switching Operation of Positioning Switch>

With reference to FIG. 13, the way of control will be described while the vehicle is on the run. The positioning switch PSW and the mode switch MSW of the vehicle are not changed from the D range/D mode. The brake fluid pressure retaining unit RU comprises a relief valve RV. Not like the vehicles shown in <Time Chart for Control (4)> and <Time Chart for Control (5)>, the vehicle is not controlled such that the engine 1 is automatically turned off when the vehicle stops.

As shown in FIG. 13, the upper part of the time chart shows a relation in time sequence between driving force and braking force of the vehicle, in which a thick line indicates driving force and a thin line indicates braking force. The middle part of the time chart shows range positions of the positioning switch PSW, in which D range is shown above P range and N range. The lower part of the time chart shows ON/OFF conditions of the solenoid valve SV.

Since the processes before the vehicle stops are the same as those described in <Time Chart for Control (4)> and the like, further explanation is omitted. The solenoid valve SV is in the shut-off position when the vehicle stops. Engaging force of the clutch is kept in weak creep after the vehicle stops. This is the same as <Time Chart for Control (3)>.

When the driver starts loosening depression of the brake pedal BP, which has been depressed more than the relief pressure of the relief valve RV, the relief valve RV works so that the braking force reduces instantly to the relief pressure (in accordance with applied brake pedal load). Brake fluid pressure is then retained within the wheel cylinder WC by the solenoid valve SV. Braking force is gradually reduced since the brake fluid pressure retaining unit RU is provided with a restriction D. In the conventional brake fluid pressure retaining unit RU', if the driver shifts the positioning switch PSW from D range to P range (N range) when greater pressure difference of brake fluid (difference of braking force) generates between the master cylinder MC and the wheel cylinder WC, the solenoid valve SV is immediately switched to the communicating position and hence the driver receives impact to his foot through the brake pedal BP.

In the vehicle having a brake fluid pressure retaining unit RU according to the invention, however, impact is not transmitted to the driver's foot since the solenoid valve SV remains in the shut-off position if the positioning switch PSW is switched from D range to P range (N range) while loosening the brake pedal BP (lower part of FIG. 13).

When the positioning switch PSW is switched from D range to P range (N range), driving force is lost (upper part of FIG. 13). However, the engine 1 remains ON. This is because the vehicle is not controlled such that the engine 1 is automatically turned off while the vehicle stops.

While the present invention has been described by way of specific examples, it is to be understood that changes and variations may be made without departing from the spirit or scope of the following claims.

According to the present invention, as long as the brake pedal BP is not released, the solenoid valve SV remains in the shut-off position even if the transmission is shifted to a non-driving position. Therefore, if depression of the brake pedal BP is released and the brake fluid pressure generated within the master cylinder MC becomes lower than that retained within the wheel cylinder WC, the greater brake fluid pressure within the wheel cylinder WC is not transmitted to the master cylinder MC.

Accordingly, the drawback that the driver receives impact to his foot through the brake pedal BP when the transmission is shifted to a non-driving position is eliminated.

In the case that the brake pedal BP is depressed when the transmission is shifted to a non-driving position, the solenoid valve SV is switched to the communicating position after depression of the brake pedal BP is released. When the brake pedal BP is released, the driver's foot is not placed on the brake pedal, or otherwise the brake pedal is not returned further. Therefore, the driver does not receive impact even if greater brake fluid pressure within the wheel cylinder WC flows instantly into the master cylinder MC. Further, when the transmission is shifted to a non-driving position, the solenoid valve SV is returned to the communicating position as soon as depression of the brake pedal BP is released. Since the brake fluid pressure retaining unit RU does not substantially actuate while the transmission is shifted to a non-driving position, the driver does not experience awkward driving operation.

What is claimed is:

1. A brake fluid pressure retaining unit in combination with a vehicle, comprising:

a solenoid valve arranged in a brake fluid passage between a master cylinder and a wheel cylinder, said solenoid valve being switchable between a communicating position in which the brake fluid passage is communicating and a shut-off position in which the brake fluid passage is shut off for retaining brake fluid pressure within the wheel cylinder, wherein the solenoid valve is switched from the communicating position to the shut-off position when the vehicle stops with a brake pedal depressed on condition that a transmission of the vehicle is selected to a driving position, and the solenoid valve is returned to the communicating position when a driving force is exerted on the vehicle, and brake fluid pressure retained within the wheel cylinder is kept until the driving force is exerted on the vehicle such that a braking force continues to act on the vehicle after releasing the brake pedal; and means for controlling said solenoid valve such that when the solenoid valve is in the shut-off position and the transmission is shifted from the driving position to a non-driving position, the solenoid valve is returned to the communicating position on condition that depression of the brake pedal is released.

2. A brake fluid pressure retaining unit in combination with a vehicle, comprising:

a solenoid valve arranged in a brake fluid passage between a master cylinder and a wheel cylinder, being switchable between a communicating position in which the brake fluid passage is communicating and a shut-off position in which the brake fluid passage is shut off for retaining brake fluid pressure within the wheel cylinder, wherein the solenoid valve is switched from the communicating position to the shut-off position when the vehicle stops with a brake pedal depressed on condition that a transmission of the vehicle is selected to a driving position, and the solenoid valve is returned to the communicating position when a driving force is exerted on the vehicle, and brake fluid pressure retained within the wheel cylinder is kept until the driving force is exerted on the vehicle such that braking force continues to act on the vehicle after releasing the brake pedal, wherein said brake fluid pressure retaining unit is controlled such that when the solenoid valve is in the shut-off position and the transmission is shifted from the driving position to a non-driving position, the solenoid valve is returned to the communicating position on condition that depression of the brake pedal is released.

* * * * *